United States Patent
Wang et al.

(10) Patent No.: US 8,238,234 B2
(45) Date of Patent: Aug. 7, 2012

(54) SWITCHING BETWEEN MIMO AND RECEIVER BEAM FORMING IN A PEER-TO-PEER NETWORK

(75) Inventors: Hua Wang, Bridgewater, NJ (US); Xinzhou Wu, Monmouth Junction, NJ (US); Thomas Richardson, South Orange, NJ (US); Pramod Viswanath, Champaign, IL (US); Junyi Li, Chester, NJ (US); Saurabh Tavildar, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 12/477,363

(22) Filed: Jun. 3, 2009

(65) Prior Publication Data

US 2010/0309781 A1    Dec. 9, 2010

(51) Int. Cl.
  *H04L 12/56*    (2006.01)
(52) U.S. Cl. ............... 370/229; 370/230.1; 375/267
(58) Field of Classification Search .............. None
  See application file for complete search history.

(56) References Cited

U.S. PATENT DOCUMENTS

| | | | |
|---|---|---|---|
| 2007/0243831 A1* | 10/2007 | Seki ................. | 455/69 |
| 2008/0151871 A1 | 6/2008 | Parts et al. | |
| 2009/0074099 A1* | 3/2009 | Zheng et al. ......... | 375/267 |
| 2009/0180429 A1* | 7/2009 | Stevens et al. ....... | 370/329 |
| 2010/0232479 A1* | 9/2010 | Kim ................... | 375/219 |

FOREIGN PATENT DOCUMENTS

| | | |
|---|---|---|
| EP | 1227539 A1 | 7/2002 |
| EP | 1387501 A1 * | 2/2004 |
| EP | 1983781 A1 | 10/2008 |

OTHER PUBLICATIONS

International Search Report and Written Opinion—PCT/US2010/037338, International Search Authority—European Patent Office—Nov. 19, 2010.
Jianchi Zhu et al: "Investigation on precoding techniques in E-Utra and proposed adaptive precoding scheme for MIMO systems" 14th Asia-Pacific Conference on Communications. APCC 2008, Tokyo, Japan, Oct. 14, 2008,—Oct. 16, 2008 p. 5 PP., XP002604464 IEEE Piscataway, NJ, USA ISBN: 978-4-88552-232-1.

* cited by examiner

*Primary Examiner* — Huy D Vu
*Assistant Examiner* — Zewdu A Beyen
(74) *Attorney, Agent, or Firm* — James O'Hare; Paul S. Holdaway

(57) ABSTRACT

Aspects describe different multiple antenna techniques that can be utilized in a peer-to-peer network based on a network congestion level. A MIMO scheme where a transmitter sends to a receiver multiple spatial streams at substantially the same time in the same traffic segment can be utilized when network congestion level is low. A receiver beam forming scheme where transmitter sends a single stream in a traffic segment and receiver uses multiple receive antennas to maximize signal to noise ratio can be utilized when network congestion level is high. The connection pair (transmitter and receiver) occupy more control resources in the MIMO scheme than the receiver beam forming scheme. The decision related to which technique to utilize can be made at about the same time as a communication is initiated. Further, if network conditions change during a communication, the antenna technique that is utilized can be switched to a different technique during the communication exchange.

24 Claims, 15 Drawing Sheets

SWITCHING BETWEEN MIMO AND RECEIVER BEAM FORMING IN A PEER-TO-PEER NETWORK

BACKGROUND

I. Field

The following description relates generally to peer-to-peer communication networks and more particularly to increasing network performance.

II. Background

Wireless communication systems or networks are widely deployed to provide various types of communication; for instance, voice and/or data may be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station, access point, or access router. The access point covers a geographic range or cell and, as the mobile device is operated, it may be moved in and out of these geographic cells.

Some networks can be constructed utilizing solely peer-to-peer communication without utilizing base stations, access points, or access routers. Such networks are sometimes referred to as ad hoc networks. Communication in such networks may, in some cases, be limited to exchanges between devices that are within direct wireless transmission range of each other, while in other cases multi-hop forwarding between non-adjacent devices may be supported. Various techniques may be used to maintain connectivity and/or forwarding information as the topology of the network changes (e.g., as devices join, leave, or move). Some networks can also be constructed utilizing a combination of both peer-to-peer devices as well as base stations, access points, or access routers.

In many communication networks, network congestion can be caused by various factors including a large number of devices conveying data at substantially the same time and/or a large amount of data being transmitted by a relatively small number of devices. Network congestions can cause problems such as degradation of a quality of service. In peer-to-peer networks, there is no central scheduler or central authority that can schedule communications and, thus, attempt to mitigate network congestion. Therefore, there exists a need to address network congestion in peer-to-peer communication networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with dynamically switching between multiple-input-multiple-output (MIMO) and receiver beam forming in a peer-to-peer network. An aspect relates to a method of operating a first wireless communications device for selection of a multiple antenna scheme for data exchange in a communications network. First wireless communications device is equipped with at least two antennas. Method includes determining a level of congestion in communications network and selecting a multiple antenna scheme from a plurality of predetermined multiple antenna schemes as a function of the determined level of congestion. The selected multiple antenna scheme is utilized to establish a data exchange with a second wireless communications device.

Another aspect relates to a communications apparatus that includes a memory and a processor. Memory retains instructions related to ascertaining whether a level of congestion in a peer-to-peer communications network is a high level of congestion or a low level of congestion. Memory also retains instructions related to selecting a multiple antenna scheme from a plurality of predetermined multiple antenna schemes as a function of whether the congestion level is low or high and utilizing the selected multiple antenna scheme to exchange data with a peer node. Processor is coupled to memory and is configured to execute instructions retained in memory.

A further aspect relates to a communications apparatus that exchanges data in a peer-to-peer communication network. Communications apparatus includes means for evaluating a network congestion level and means for selecting a multiple antenna scheme from a plurality of predetermined multiple antenna schemes as a function of network congestion level. Wireless communications apparatus also includes means for utilizing the selected multiple antenna scheme to exchange data with a peer node within the peer-to-peer communications network.

Still another aspect relates to a computer program product comprising a computer-readable medium. The computer-readable medium includes a first set of codes for causing a computer to estimate a level of congestion in a peer-to-peer communication network and a second set of codes for causing the computer to select a receiver beam forming scheme or a MIMO scheme as a function of the level of congestion. Also included is a third set of codes for causing the computer to continue to monitor the level of congestion during the data exchange in order to determine if the level of congestion changes. Further, computer-readable medium includes a fourth set of codes for selectively switching between receiver beam forming scheme and MIMO scheme if the level of congestion changes. The switch is from receiver beam forming scheme to MIMO scheme if the congestion level changes from high to low and the switch is from MIMO scheme to receiver beam forming scheme if the congestion level changes from low to high.

Yet another aspect relates to at least one processor configured to use different antenna techniques to exchange data with a peer node. The processor includes a first module for determining whether a level of congestion in a communications network is a low level or a high level and a second module for selecting a multiple antenna scheme from a plurality of predetermined multiple antenna schemes as a function of whether the level of congestion is the low level or the high level. Also included in processor is a third module for exchanging data with a wireless communications device using the selected multiple antenna scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
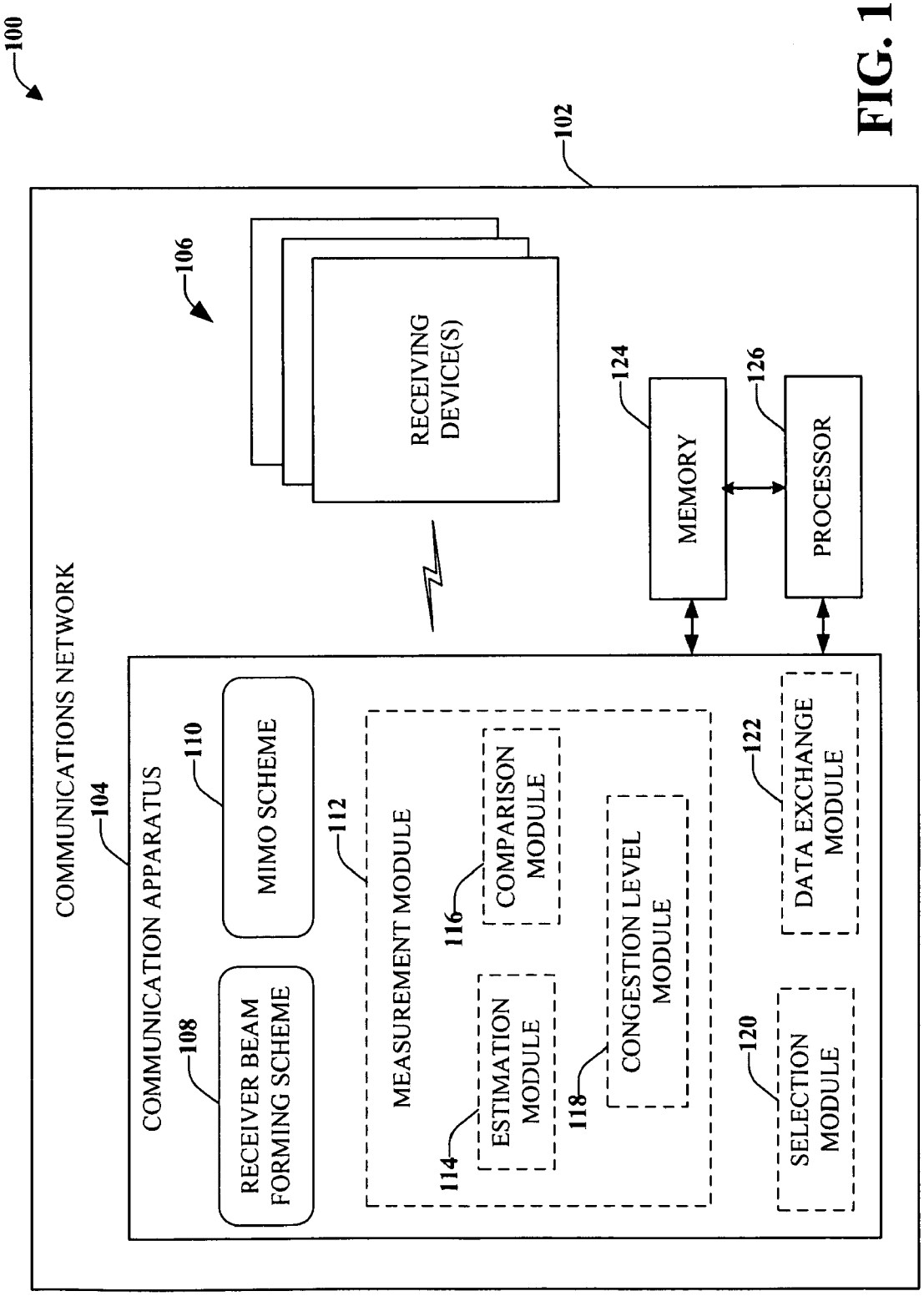
FIG. 1 illustrates a system that dynamically switches between multiple antenna schemes as a function of a network congestion level, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules, and so forth, discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

With reference initially to FIG. 1, illustrated is a system 100 that dynamically switches between multiple antenna schemes as a function of a network congestion level, according to an aspect. Multiple antenna schemes can help improve system 100 capacity. For the purposes of this detailed description, references will be made to two main types of multiple antenna techniques, namely, a receiver beam forming scheme and a Multiple-Input-Multiple-Output (MIMO) scheme, however, other schemes may be utilized. For receiver beam forming schemes, the various aspects refer to the case where a single spatial steam is utilized between a transmitter and a receiver and multiple receiver antennas are used. For MIMO schemes, the various aspects will be described with reference to the technology where multiple spatial streams are transmitted between a transmitter and a receiver.

System 100 includes a communications network 102, which can be a peer-to-peer network. Included in network 102 is a communications apparatus 104 (sometimes referred to as a transmitting device) that communicates with one or more receiving devices 106. Although a number of transmitting devices 104 and receiving devices 106 can be included in communications network 102, as will be appreciated, a single transmitting device 104 that transmits communication data signals to a single receiving device 106 is illustrated for purposes of simplicity.

Communication apparatus 104 is equipped with multiple antennas and has capability to transmit utilizing a multiple antenna scheme that is selected from a plurality of predetermined multiple antenna schemes. In an example, a receiver beam forming scheme 108 can be utilized wherein the beam form is transmitted in the receive direction (e.g., in the direction of receiving device 106). A Multiple-Input-Multiple-Output (MIMO) scheme 110 can be transmitted as two different streams. Further information related these multiple antenna transmission schemes will be provided below.

A measurement module 112 is configured to observe traffic (e.g., data exchanges) in network 102 and determine a level of congestion. Measurement module 112 can observe and measure the level of congestion prior to initiating a communication, during a communication, or at other times (e.g., gathering information in anticipation of a data exchange).

In accordance with some aspects, to measure the amount of traffic (e.g., congestion) in network 102, measurement module 112 can include an estimation module 114 that is configured to assess a number of active connections occurring in network 102 at the time of the measurement (e.g., currently active). Also included in measurement module 112 is a comparison module 116 that is configured to evaluate the estimated number of active connections with a predetermined active connection threshold. Based on the estimate, a congestion level module 118 is configured to determine whether the level of congestion is low or high. The level of congestion can be low if the estimated number of active connections is below the active connection threshold. If the estimated number of active connections is at or above the active connection threshold, congestion level module 118 can determine that the level of congestion is high.

According to some aspects, estimation module 114 is configured to assess the amount of traffic exchange occurring in network 102 and comparison module 116 compares the estimated amount of traffic exchange with a predetermined active connection threshold. As a function of the comparison, congestion level module 118 can determine whether the level of congestion is high or low. If the estimated amount of traffic is at or above an active connection threshold, congestion level module 118 can determine the level of congestion is high. However, if the estimated amount of traffic is below active connection threshold, congestion level module 118 can determine there is a low level of congestion in network.

As a function of the amount of congestion, a selection module 120 decides whether to utilize receiver beam forming scheme 108 or MIMO scheme 110. For example, if it is determined that the level of congestion is high, selection module 120 can select receiver beam forming scheme 108. If the level of congestion is low, selection module 120 can select MIMO scheme. A data exchange module 122 can utilize the selected multiple antenna scheme to establish (or continue) a data exchange with a peer node (e.g., receiving device 106).

In accordance with some aspects, a congestion threshold can be defined, wherein below the congestion threshold the amount of congestion does not affect communications. However, if the amount of congestion measured in network 102 is at or above the congestion threshold, there can be an impact on the communication (e.g., poor quality of service). Thus, if the measured congestion level is below the congestion threshold, selection module 120 will choose the MIMO stream 110. However, if the congestion level is at or above the congestion threshold, selection module 120 will choose the receiver beam forming scheme 108.

System 100 can include memory 124 operatively coupled to communication apparatus 104. Memory 124 can be external to communication apparatus 104 or can reside within communication apparatus 104. Memory 120 can store information related to calculating an amount of traffic in a communication network, selectively utilizing a receiver beam forming scheme or a MIMO scheme for data exchange between a transmitter and a receiver, and other suitable information related to signals transmitted and received in communication network 102. A processor 126 can be operatively connected to communication apparatus 104 (and/or memory 124) to facilitate analysis of information related to improving capacity of a communication network. Processor 126 can be a processor dedicated to analyzing and/or generating information received by communication apparatus 104, a processor that controls one or more components of system 100, and/or a processor that both analyzes and generates information received by communication apparatus 104 and controls one or more components of system 100.

Memory 124 can store protocols associated with conveying data, taking action to control communication between receiver 106 and transmitter 104, and so forth, such that system 100 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 2:
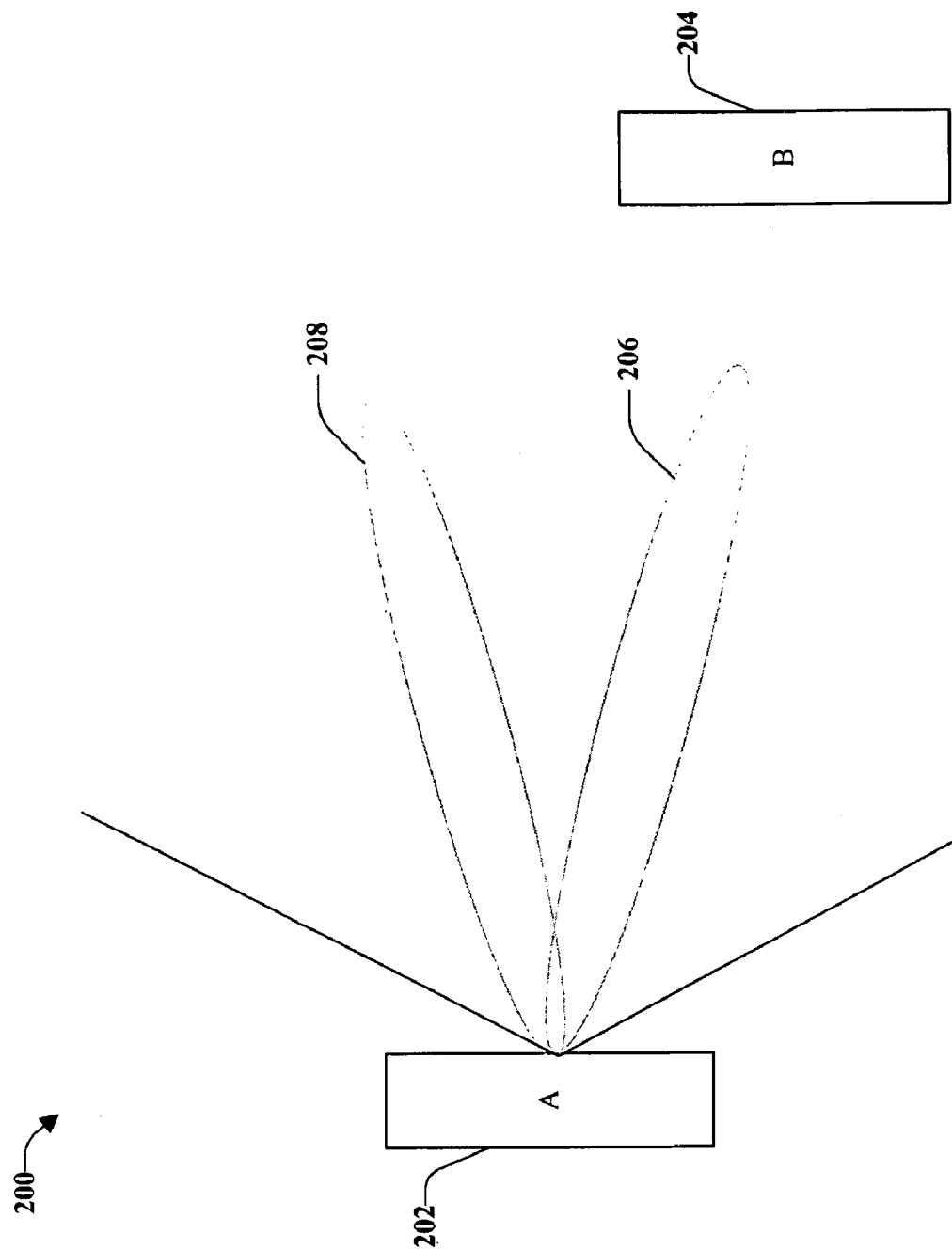
FIG. 2 illustrates a schematic representation of signaling and interference within a communication network in accordance with an aspect.

In order to appreciate the disclosed aspects fully, FIG. 2 illustrates a schematic representation 200 of antenna techniques within a communication network in accordance with an aspect. Illustrated are two devices, Device A 202 and Device B 204. Both Devices A 202 and B 204 have at least two antennas. For example, Device A 202, in this illustration, is a transmitting device and has two transmit antennas. Device B 204 is a receiving device and has two receive antennas. Multiple antennas at the transmitter and receiver can provide diversity against fading on the radio channel, can shape the transmit beam and/or receive beam, and so forth.

When knowledge of the relative channel phases is available to the transmitter device 202, multiple antennas can be utilized to provide beam forming, which is shaping of the antenna beam 206 in the direction of target receiver 204. This beam forming can increase the signal strength at receiver 204. Alternatively or additionally, multiple antennas at receiver 204 and transmitter 202 can improve a receiver signal-to-noise ratio in proportion to the number of antennas by applying beam forming at transmitter 202 and receiver 204.

Transmitter 202 can selectively determine whether to transmit a single beam 206 (e.g., receiver beam forming scheme), or whether to transmit multiple beams 206, 208 (e.g., MIMO scheme). The number of beams illustrated has been limited to two beams for simplicity purposes. However, it should be understood that multiple additional beams may be generated. Beams 206, 208 can be orthogonal as illustrated or the coverage area of the beams may overlap.

Both MIMO schemes and receiver beam forming schemes can improve network performance in different manners and with different system costs. For MIMO schemes, the focus can be to boost the data rate between a single transmitter/receiver pair at the cost of more encoding/decoding complexity at the devices. In the case where an interference avoidance mechanism exists, more resources might need to be reserved for multiple antenna devices so that the multiple antenna devices can coexist with single antenna devices in a seamless manner. On the other hand, receiver beam forming focuses on improving the spatial reuse in a congested system so that every transmitter/receiver pair can gain from it in the long term with almost no additional cost to overall system design. However, when network is not congested, receiver beam forming schemes do not bring a degree-of-freedom gain and becomes less beneficial. Given the properties of both schemes, a receiver beam forming scheme can be utilized in a congested network. In a sparse network where system resource is not the bottleneck, MIMO schemes can be utilized.

In accordance with some aspects, MIMO schemes can be used with fixed beam forming patterns. In particular, devices with well-conditioned matrix channels can be scheduled using MIMO schemes. In a MIMO system, multiple data streams corresponding to a single device are scheduled at a same time and frequency on multiple beams, thereby increasing the data rate.

MIMO schemes can be used with frequency division systems such as an orthogonal frequency division multiple access (OFDMA) system. An OFDMA system partitions the overall system bandwidth into multiple orthogonal subbands. These subbands are also referred to as tones, carriers, subcarriers, bins, and/or frequency channels. Each subband is associated with a subcarrier that can be modulated with data. An OFDMA system may use time and/or frequency division multiplexing to achieve orthogonality among multiple data transmissions for multiple devices.

Figure 3:
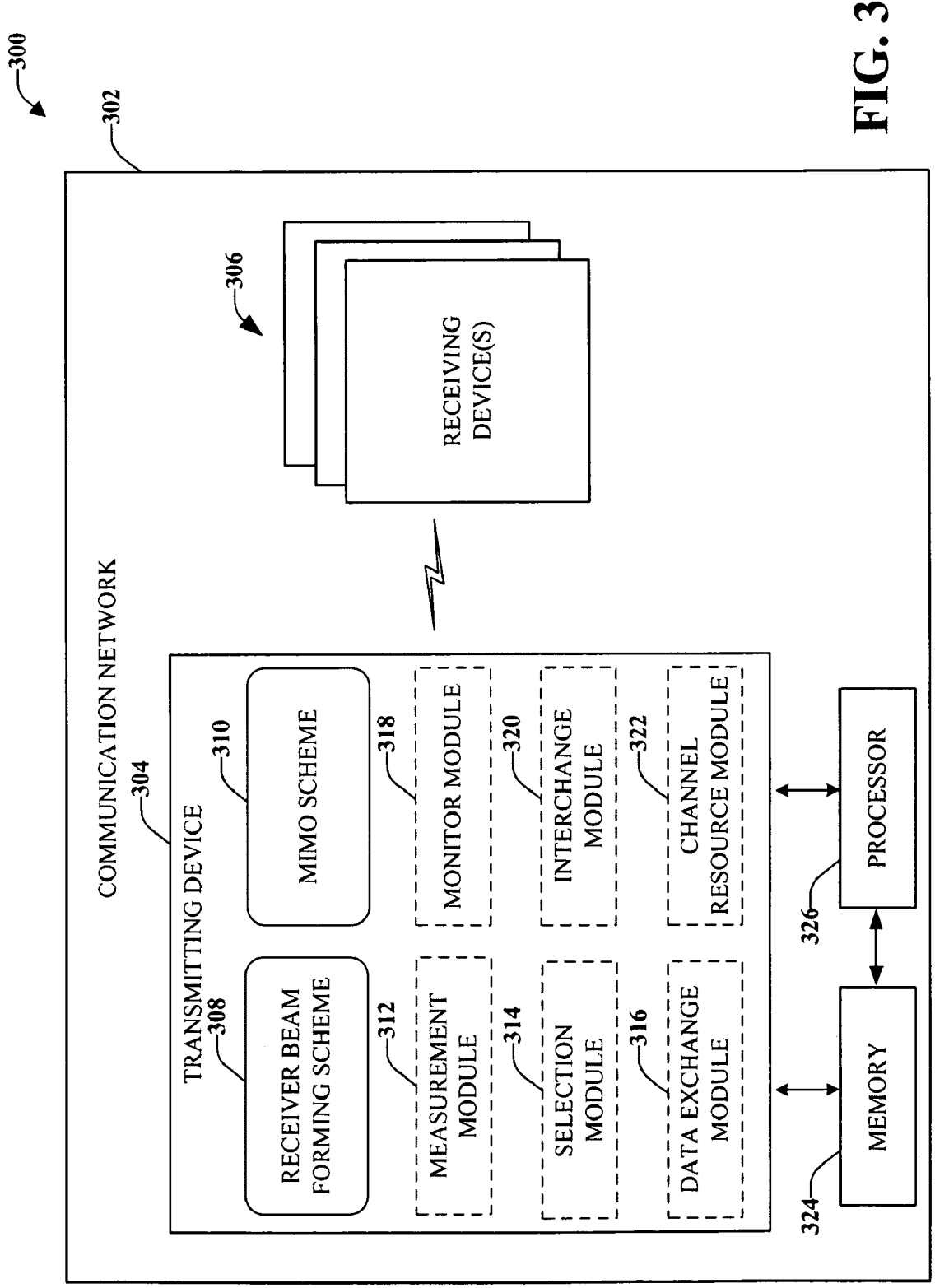
FIG. 3 illustrates a system for selecting one of a plurality of predetermined multiple antenna schemes as a function of a network congestion level, according to an aspect.

FIG. 3 illustrates a system 300 for selecting one of a plurality of predetermined multiple antenna schemes as a function of a network congestion level, according to an aspect. System 300 includes a communication network 302, which can be a peer-to-peer network. Included in network 302 is a transmitting device 304 that communicates with one or more receiving devices 306. Although a number of transmitting devices 304 and receiving devices 306 can be included in communication network 302, as will be appreciated, a single transmitting device 304 that transmits communication data signals to a single receiving device 306 is illustrated for purposes of simplicity.

Transmitting device 304 has the functionality to transmit both a single spatial stream and multiple spatial streams (e.g., transmitting device has multiple antennas). Further, receiving device 306 can have multiple antennas. Thus, transmitting device 304 can utilize receiver beam forming schemes 308 and/or MIMO schemes 310 to convey data to receiving device 306.

A measurement module 312 is configured to analyze network 302 and make a determination related to an amount of traffic (or congestion) within network 302. Based on the amount of traffic, a selection module 314 makes a determination whether receiver beam forming scheme 308 or MIMO scheme 310 should be utilized by data exchange module 316 to communicate with receiving device 306.

In order to determine the amount of network traffic, measurement module 312 can be configured to analyze the number of active connections currently within network 302. If the number of active connections is below a connection threshold, it indicates that the amount of traffic in network 302 is not causing network congestion (level of congestion is low) and selection module 314 can choose MIMO scheme 310, which is utilized by data exchange module 316 to communicate with receiving device 306. However, if the number of active connection is at or above the connection threshold, it can indicate that there is a high level of congestion within network 302 and, therefore, selection module 314 can choose receiver beam forming scheme 308, which is the scheme that can be utilized by data exchange module 316 to communicate to receiving device 306.

In accordance with some aspects, measurement module 312 can be configured to observe a traffic channel and determine how often that traffic channel is being used. A usage threshold can be established wherein if the observed usage is below the usage threshold, network 302 is not congested (e.g., level of congestion is low), and, therefore, MIMO scheme 310 can be utilized by data exchange module 316 to communicate with receiving device 306. However, if the observed usage is at or above the usage threshold, it indicates that network 302 is congested (e.g., level of congestion is high) and receiver beam forming scheme 310 should be utilized by data exchange module 316 to communicate with receiving device 306.

In accordance with some aspects, a monitor module 318 can be configured to monitor network 302 during data exchange with receiving device 306. If a change in network 302 conditions (e.g., congestion level) is observed, an interchange module 320 can make a determination whether the chosen multiple antenna scheme should be changed to one of the non-selected multiple antenna schemes to accommodate the change in network 302 conditions (e.g., change in congestion level).

Thus, if data exchange was initiated utilizing MIMO scheme 310 (e.g., network congestion level was low), for example, and the current observation by monitor module 318 indicates that network 302 is now congested (e.g., congestion level is high), monitor module 318 can notify interchange module 320, which can selectively change from MIMO scheme 310 to receiver beam forming scheme 308. In this case, a channel resource module 322 can release one of at least two reserved distinct sets of channel resources and data exchange module 316 can continue to exchange data with receiver device 306 using receiver beam forming scheme 308.

In another example, if data exchange was initiated with receiver beam forming scheme 308 (e.g., network congestion level was high), and network 302 is no longer congested (e.g., network congestion level has changed to low), as determined by monitor module 318, interchange module 320 might decide that there should be a switch to the MIMO scheme 310. However, in accordance with some aspects, even though there is a change in network 302 conditions, interchange module 320 might determine that the antenna scheme should not change, which can be based on other factors (e.g., capability of transmitting device 304, capability of receiving device 306, or other factors). If interchange module 320 switches from receiver beam forming scheme 308 to MIMO scheme 310, channel resource module 322 reserves at least one additional set of channel resources. The one additional set of channel resources is distinct from an already reserved set of channel resources. Data exchange module 316 continues to exchange data with receiving device 306 using MIMO scheme 310.

Data exchange module 316 is configured to continue to exchange data with receiving device 306 using the newly selected multiple antenna scheme. The switch from the previously selected multiple antenna scheme to the newly selected multiple antenna scheme can be transparent to transmitting device 304 and receiving device 306.

By way of example and not limitation, when transmitting device 304 wants to establish a connection with another device (e.g., receiving device 306), transmitting device 304 obtains a connection ID during a paging stage though a connection ID channel. During the paging stage, every existing connection marks their choice of connection ID in a predefined period of time. In this case, a transmitting device 304 with MIMO capability with its intended receiver 306 can choose multiple connection IDs and initiate a MIMO session if the number of total connections IDs seen if below a certain percentage of the total connection ID space. If the connection ID space is already occupied by more than the percentage, transmitting device 304 can just obtain one connection ID and initiate a non-MIMO session with receiving device 306 utilizing receiver beam forming.

System 300 can include memory 324 operatively coupled to transmitting device 304. Memory 32 can be external to transmitting device 304 or can reside within transmitting device 304. Memory 324 can store information related to calculating an amount of traffic in a communication network, determining whether the amount of traffic causes a high congestion level or a low congestion level, and selectively switching between a receiver beam forming scheme and a MIMO scheme as a function of a change in the congestion level (e.g., from low to high, from high to low). Memory 324 can store other suitable information related to signals transmitted and received in communication network 302. A processor 326 can be operatively connected to transmitting device 304 (and/or memory 324) to facilitate analysis of information related to increasing capacity of a communication network. Processor 326 can be a processor dedicated to analyzing and/or generating information received by transmitting device 304, a processor that controls one or more components of system 300, and/or a processor that both analyzes and generates information received by transmitting device 304 and controls one or more components of system 300.

Figure 4:
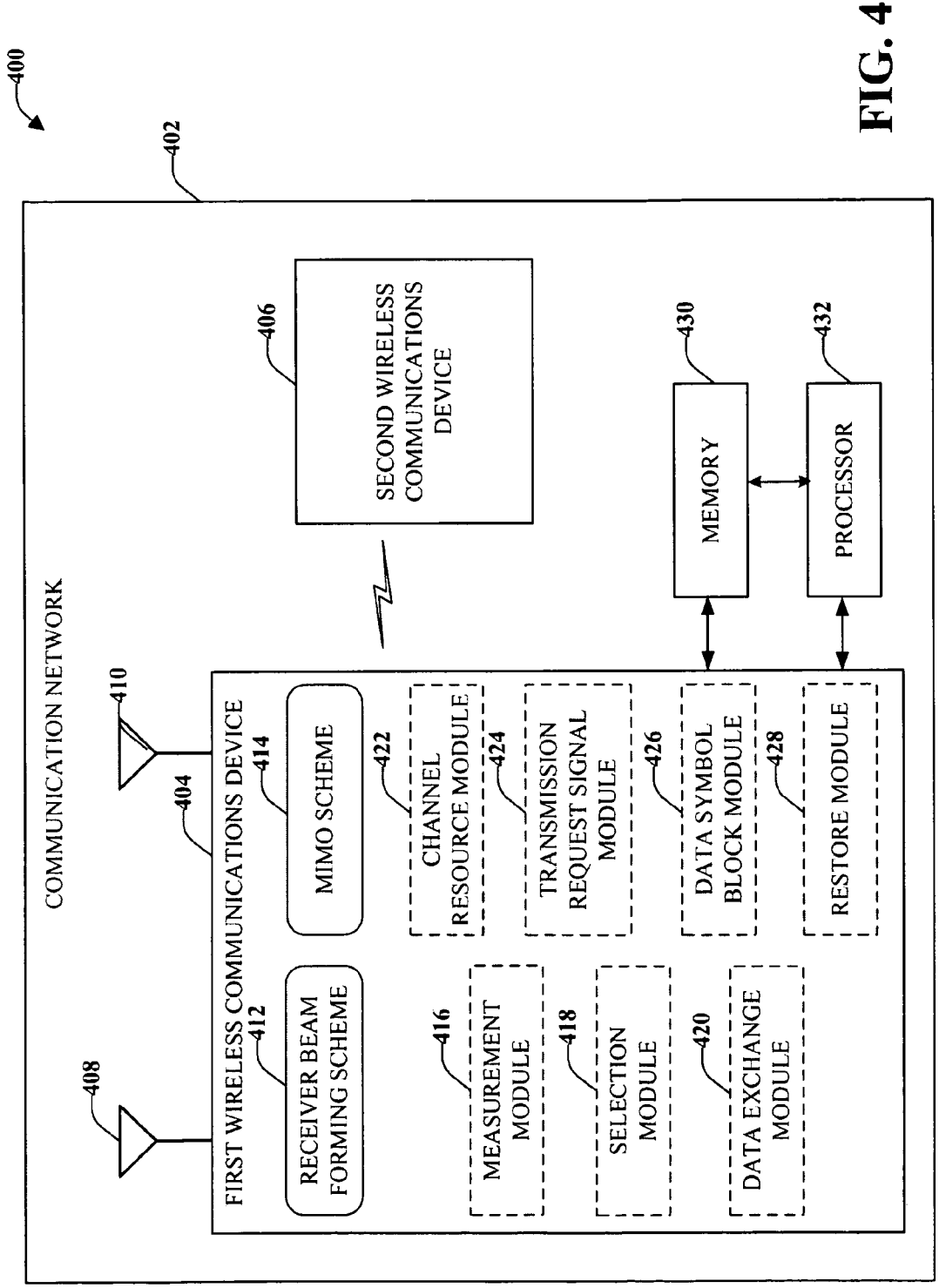
FIG. 4 illustrates a system for selection of a multiple antenna scheme for data exchange in a communication network in accordance with various aspects.

FIG. 4 illustrates a system 400 for selection of a multiple antenna scheme for data exchange in a communication network in accordance with various aspects. System 400 includes a peer-to-peer communications network 402 that comprises a multitude of devices, illustrated as first wireless communications device 404 and second wireless communications device 406.

First wireless communications device 404 is equipped with at least two antennas 408 and 410 and can communicate utilizing a receiver beam forming scheme 412 and/or a MIMO scheme 414 (as well as other communication schemes). A measurement module 416 is configured to determine an amount of congestion in network 402 and a selection module 418 selects one of the schemes as function of the congestion level. For example, if the congestion level is high, receiver beam forming scheme 412 can be selected. If the congestion level is low, MIMO scheme 414 can be utilized. The selected scheme can be utilized by data exchange module 420 to communicate with second wireless communications device 406.

If receiver beam forming scheme 412 is selected (e.g., level of congestion is high), a channel resource module 422 is configured to reserve one set of channel resources. A transmission request signal module 424 is configured to receive a transmission request signal in the set of channel resources selected by channel resource module 422. The transmission request signal indicates second wireless communications device 406 intends to send a set of data information to first wireless communications device 404 in a traffic segment. A data traffic signal is received, at the two (or more antennas 408, 410 in the traffic segment.

In accordance with some aspects, a data symbol block module 426 is configured to apply a receiver beam forming vector to the received data traffic signal to generate a transformed data symbol block. A restore module 428 is configured to recover a set of data information from the transformed data symbol block. The receiver beam forming vector can be calculated to maximize the signal to interference plus noise ratio of the transformed data symbol block.

If MIMO scheme 414 is selected for data exchange (e.g., level of congestion is low), channel resource module 422 is configured to reserve at least two distinct sets of channel resources. A set of channel resources comprises a tone in an OFDM symbol. Transmission request signal module 424 is configured to receive a first transmission request signal in one of the at least two distinct sets of channel resources. The first transmission request signal indicates second wireless communications device 406 intends to send a first set of data information to first wireless communications device 404 in a traffic segment. Transmission request signal module 424 also is configured to receive a second transmission request signal in a different one of the at least two distinct set of channel resources. The second transmission request signal indicates second wireless communications device 406 intends to send a second set of data to first wireless communications device 404 in the traffic segment. A data traffic signal is received, at the two or more antennas 408, 410, in the traffic segment.

In accordance with some aspects, data symbol block module 426 is configured to apply a MIMO receive matrix to the received data traffic signal to generate a first transformed data symbol block and a second transformed data symbol block. Restore module 428 is configured to recover a first set of data information for the first transformed data symbol block and a second set of data information for the second transformed data symbol block. MIMO receive matrix can be calculated to diagonalize a MIMO channel from second wireless communications device 406 to first wireless communications device 404.

A memory 430 and a processor 432 can be communicatively coupled to first wireless communications device 404. Memory 430 stores instruction related to data exchange in accordance with the disclosed aspects. Processor 432 is configured to execute the instructions retained in memory 430.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
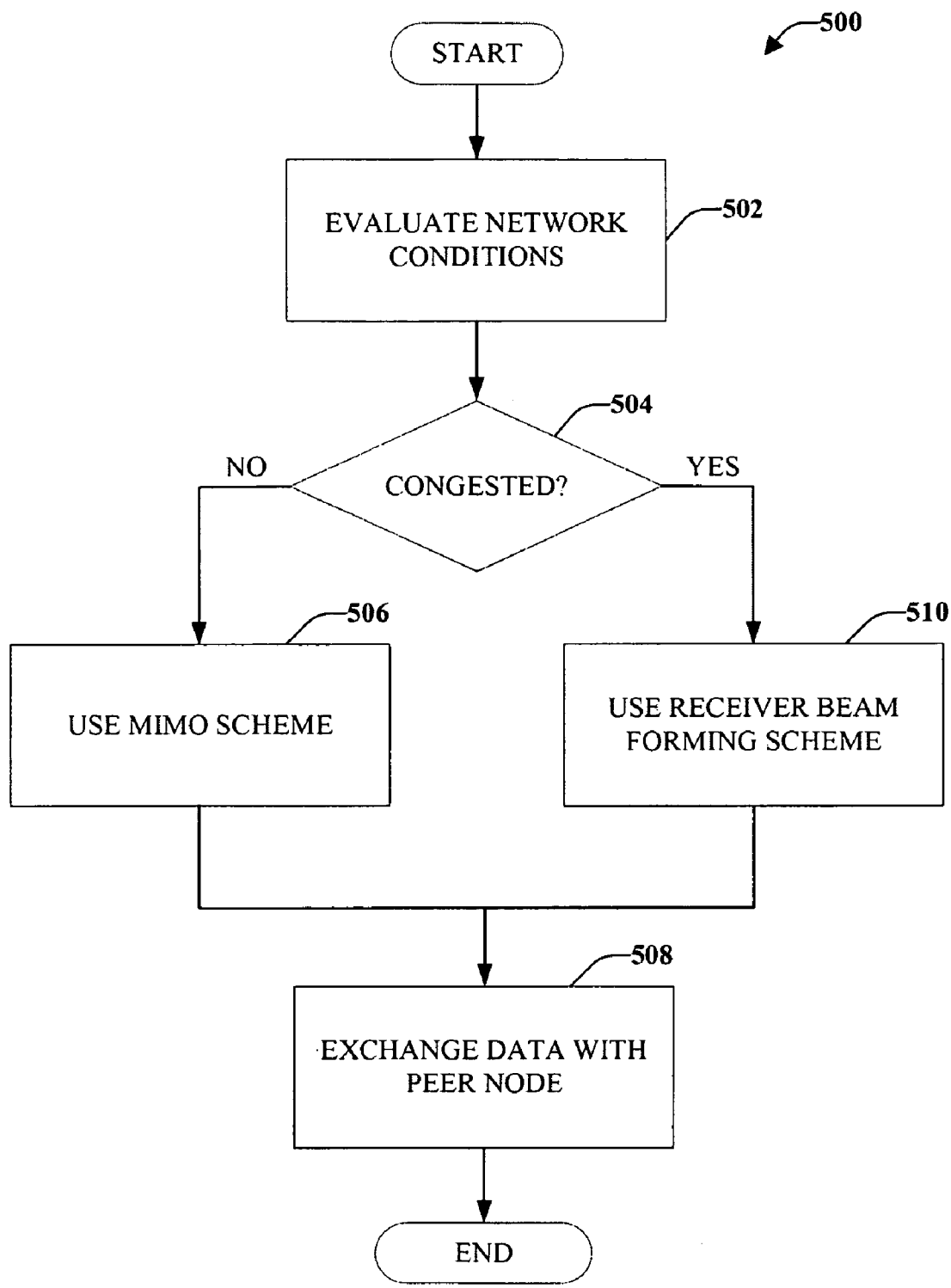
FIG. 5 illustrates a method of operating a first wireless communications device for selecting a multiple antenna scheme for exchanging data in a communications network, according to an aspect.

FIG. 5 illustrates a method 500 of operating a first wireless communications device for selecting a multiple antenna scheme for exchanging data in a communications network, according to an aspect. Method 500 is configured to use different multiple antenna techniques in a peer-to-peer network based on a network congestion level. A first wireless communications device is equipped with at least two antennas.

Method 500 starts, at 502, with evaluation of network conditions to determine a level of congestion. In accordance with some aspects, the evaluation of network conditions can include estimating the number of connections currently active in the communications network. According to some aspects, the evaluation of network conditions includes estimating the amount of traffic currently being exchanged in the communications network.

Based on the network condition evaluation, at 504, a determination is made whether there is a high level of congestion or a low level of congestion in the network. For example, the congestion level is high if the estimated number of active connections is at or above an active connection threshold. The level of congestion is low if the estimated number of active connections is below the active connection threshold. In another example, the level of congestion is high if an estimated amount of traffic is at or above an active connection threshold. The level of congestion is low if the estimated amount of traffic is below the active connection threshold.

Based on the congestion determination, at 504, a multiple antenna scheme from a plurality of predetermined multiple antenna schemes is selected as a function of the determined level of congestion. For example, if there is a low level of congestion in network ("NO"), method 500 continues, at 506, and a MIMO scheme can be utilized to establish a data exchange with a peer node (e.g., second wireless communications device), at 508.

If there is a high level of congestion in network ("YES"), method 500 continues, at 510, and a receiver beam forming scheme is utilized to establish a data exchange with the peer node, at 508.

Figure 6:
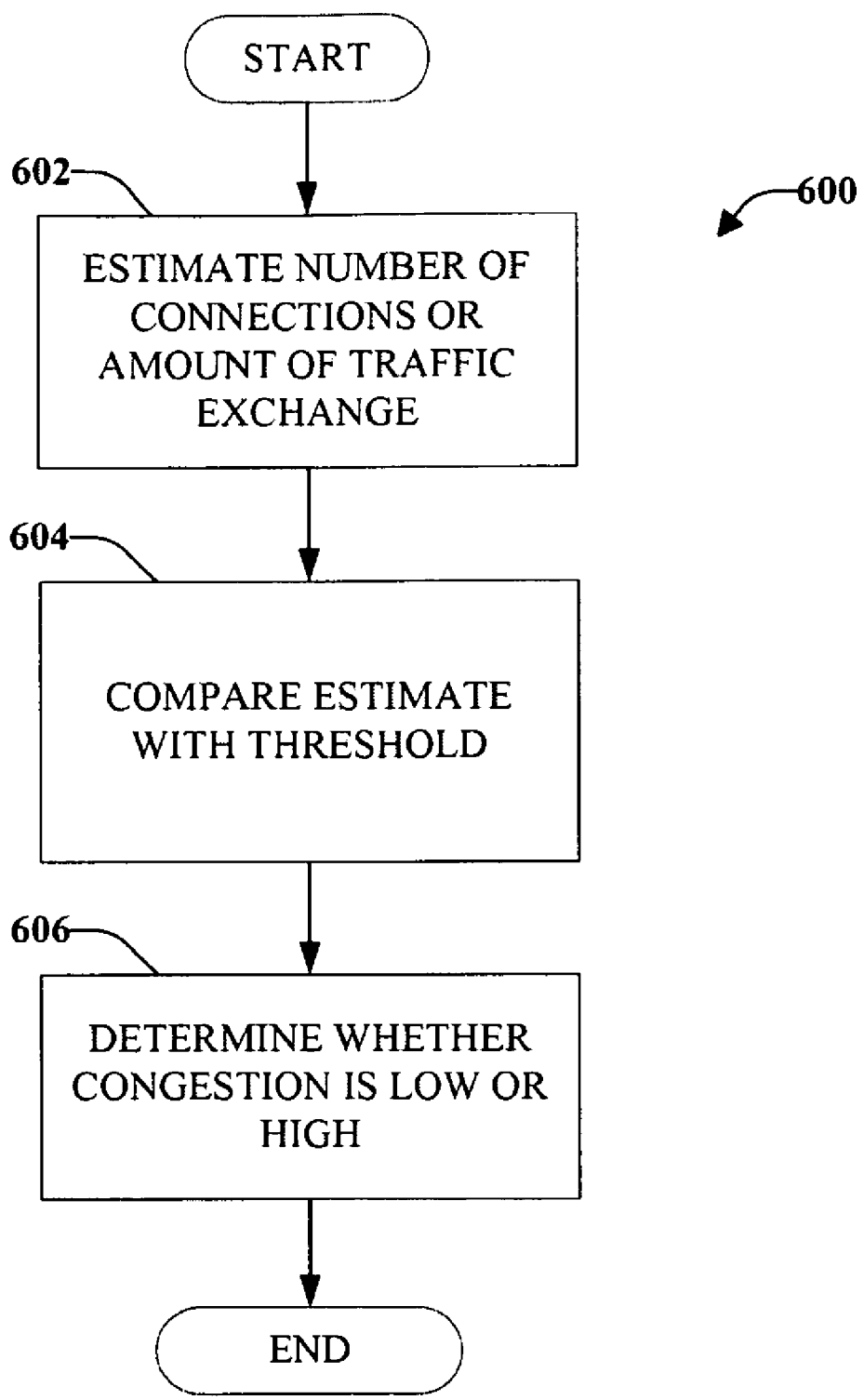
FIG. 6 illustrates a method for determining a level of congestion in a communications network, according to an aspect.

FIG. 6 illustrates a method for determining a level of congestion in a communications network, according to an aspect. Method 600 can be utilized for at least two different manners of determining the level of congestion, which are based on a number of active connections or based on an amount of traffic exchange.

In accordance with some aspects, at 602, a number of connections currently active in the communications network is estimated. This estimate of active connections is compared, at 604, with a predetermined active connection threshold. At 606, a determination is made whether the level of congestion is low or high. The level of congestion is low if the estimated number of active connections is below the active connection threshold. The level of congestion is high if the estimated number of active connections is at or above the active congestion threshold.

In accordance with other aspects, at 602, an amount of traffic exchange occurring in the communications network is estimated. At 604, the estimated amount of traffic exchange occurring is compared with a predetermined active connection threshold. At determination is made, at 606, whether the level of congestion is low or high. The level of congestion is low if the estimated amount of traffic is below the active connection threshold. The level of congestion is high if the estimated amount of traffic is at or above the active connection threshold.

Figure 7:
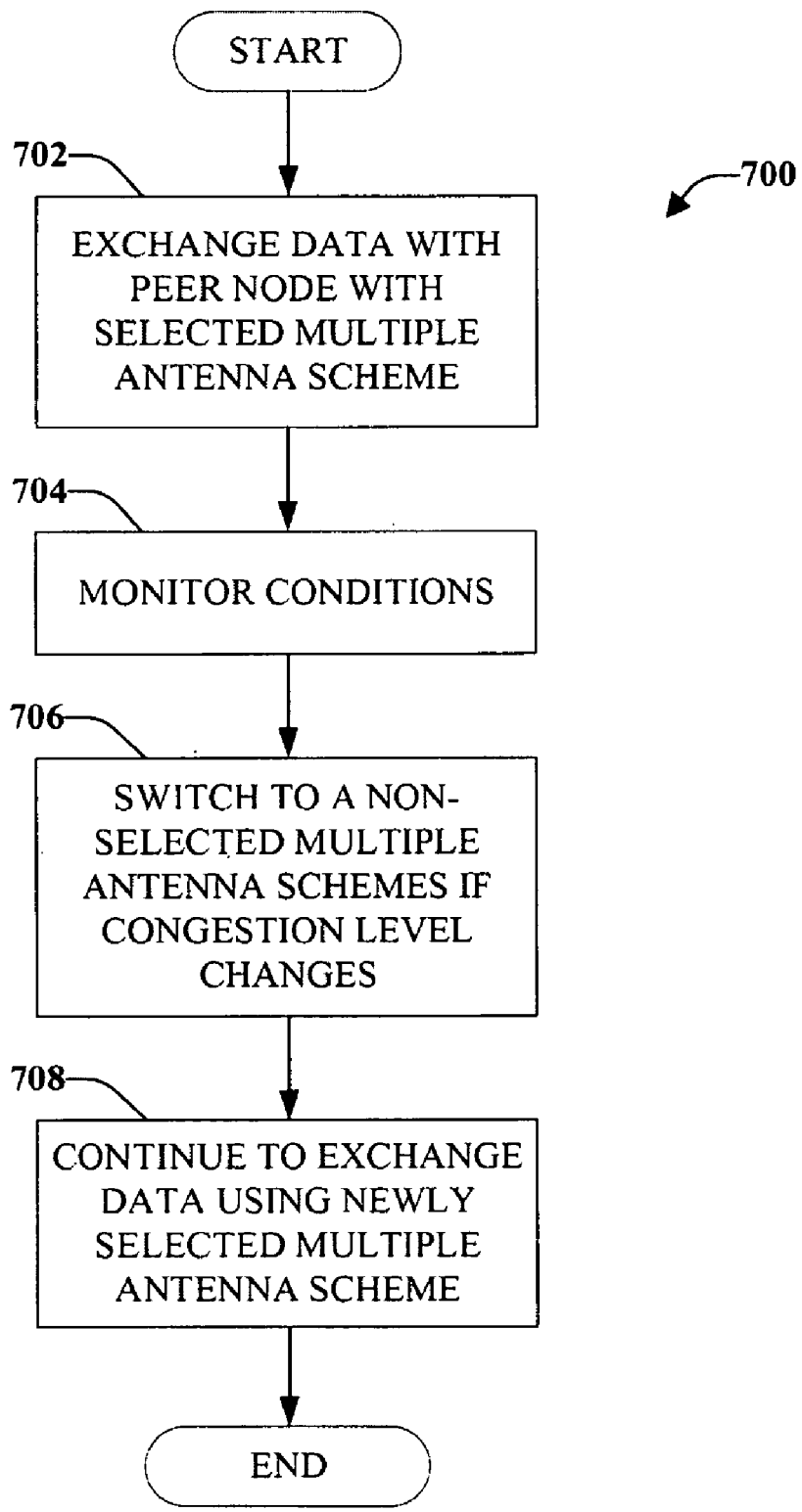
FIG. 7 illustrates a method for selectively switching between multiple antenna schemes as a function of a detected change in network congestion level, according to an aspect.

FIG. 7 illustrates a method 700 for selectively switching between multiple antenna schemes as a function of a detected change in network congestion level, according to an aspect. At 702, data is exchanged with a peer node using a selected multiple antenna scheme. The multiple antenna scheme can be selected from a plurality of predetermined multiple antenna schemes as a function of a determined level of congestion.

Network conditions are monitored, at 704. This monitoring can be performed continuously, periodically, or based on other configurable intervals. Monitoring of network conditions is performed to determine whether this is a change in the congestion level (e.g., congestion level changes from low to high, congestion level changes from high to low). A change in congestion level causes method 700 to selectively switch from the selected multiple antenna scheme to one of the non-selected multiple antenna schemes, at 706. The determination as to which of the previously non-selected multiple antenna schemes to utilize can be made as a function of whether the level of congestion changed from low to high or from high to low. At 708, data exchange with the peer node continues using the newly selected multiple antenna scheme. The transfer from the previously selected multiple antenna scheme to the newly selected multiple antenna scheme can be transparent to the communicating nodes.

Figure 8:
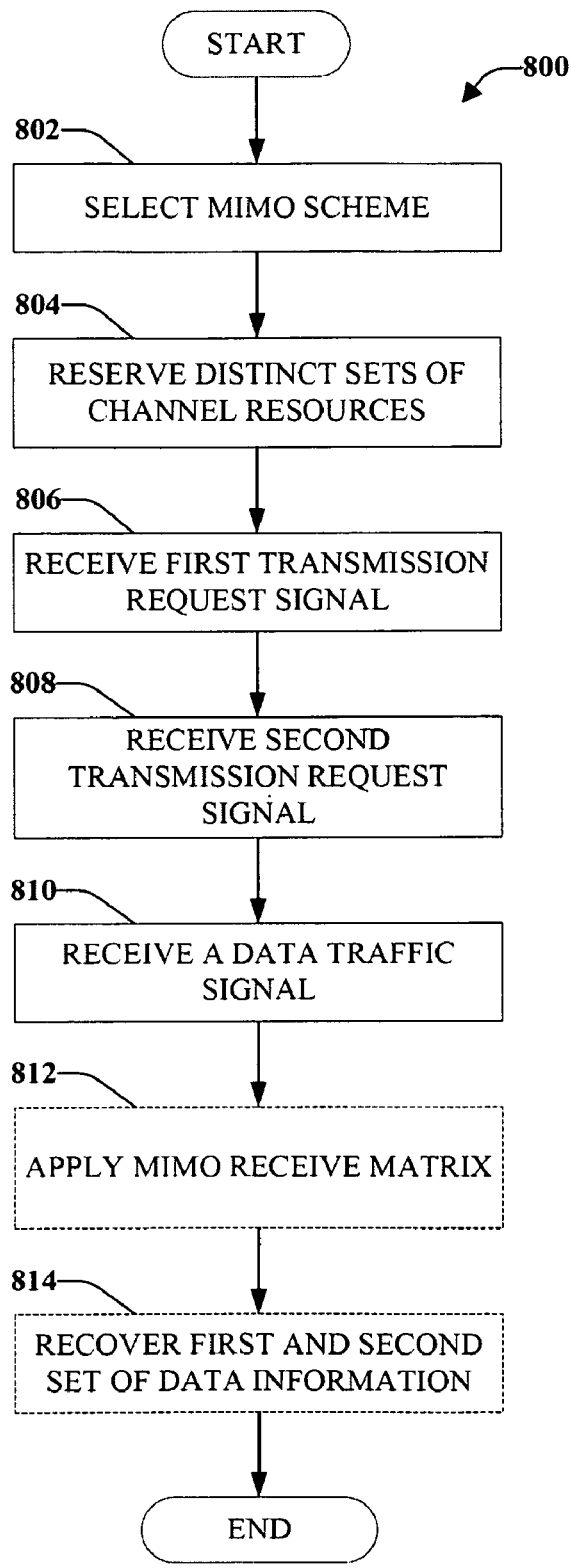
FIG. 8 illustrates a method for selecting a MIMO scheme for data exchange with a peer node in a peer to peer communications network in accordance with various aspects.

FIG. 8 illustrates a method 800 for selecting a MIMO scheme for data exchange with a peer node in a peer to peer communications network in accordance with various aspects. Method 800 can be performed by a mobile device that comprises a memory and a processor communicatively coupled to mobile device. The mobile device is equipped with two or more antennas. Method 800 starts, at 802, when a MIMO scheme is selected. This selection can be made if a determined level of congestion in peer to peer communications network is low.

At 804, two or more distinct sets of channel resources are reserved. A set of channel resources can comprise a tone in an OFDM symbol. A first transmission request signal in one of the two or more distinct sets of channel resources is received, at 806. The first transmission request signal indicates peer node intends to send a first set of data information to mobile device in a traffic segment.

A second transmission request signal is received, at 808. The second transmission request signal can be received in a different one of the two or more distinct set of channel resources. The second transmission request signal indicates peer node intends to send a second set of data to mobile device in the traffic segment. At 810, a data traffic signal is received in the traffic segment. The data traffic signal is received at the two or more antennas of mobile device.

In accordance with some aspects, method 800 can continue, at 812, where MIMO receive matrix is applied to the received data traffic signal. The MIMO receive matrix is applied to generate a first transformed data symbol block and a second transformed data symbol block. The MIMO receive matrix can be calculated to diagonalize a MIMO channel from peer node to mobile device. At 814, a first set of data information is recovered for the first transformed data symbol and a second set of data information is recovered for the second transformed data symbol block.

Figure 9:
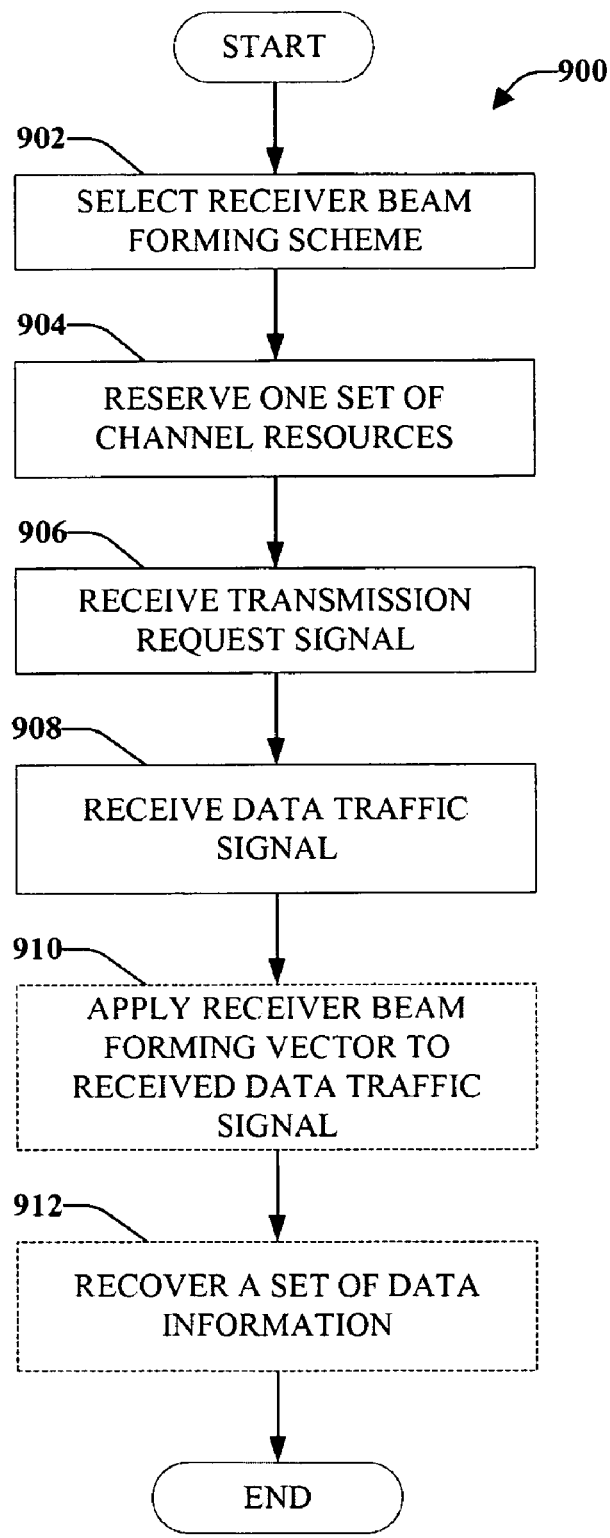
FIG. 9 illustrates a method for selecting a receiver beam forming scheme for data exchange with a peer node in a peer to peer communications network in accordance with various aspects.

FIG. 9 illustrates a method 900 for selecting a receiver beam forming scheme for data exchange with a peer node in a peer to peer communications network in accordance with various aspects. Method 900 can be performed by a mobile device that includes a memory and a processor. Further, mobile device can be equipped with at least two antennas. Method 900 starts, at 902, when a receiver beam forming scheme is selected. The receiver beam forming scheme can be selected if a determined level of congestion in peer to peer communications network is high.

At 904, one set of channel resources is reserved. A transmission request signal is received, at 906, in the set of channel resources. Transmission request signal indicates that a per node intends to send a set of data information to mobile device in a traffic segment. At 908, a data traffic signal is received in the traffic segment. The data traffic signal is received at the at least two antennas of mobile device.

In accordance with some aspects, at 910, a receiver beam forming vector is applied to the received data traffic signal to generate a transformed data symbol block. At 912, a set of data information is recovered from the transformed data symbol block. According to some aspects, receiver beam forming vector can be calculated to maximize the signal to interference plus noise ratio of the transformed data symbol block.

Figure 10:
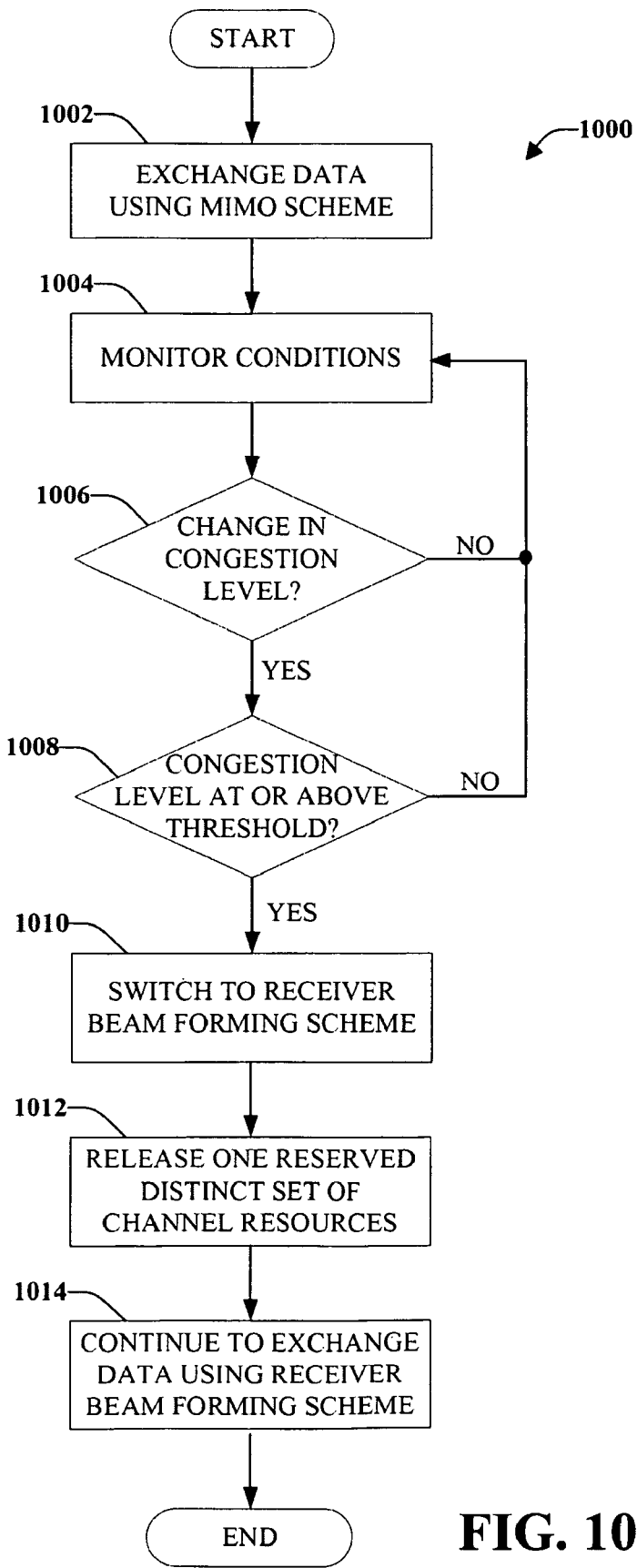
FIG. 10 illustrates a method for switching from a MIMO scheme to a receiver beam forming scheme based on changes in a network congestion level, according to an aspect.

FIG. 10 illustrates a method 1000 for switching from a MIMO scheme to a receiver beam forming scheme based on changes in a network congestion level, according to an aspect. At 1002, data is exchanged using a MIMO scheme (or another multiple spatial stream antenna technique). The decision to use a MIMO scheme could have been made at about the same time as communication initiation. Alternatively or additionally, the decision to utilize a MIMO scheme was made during a data exchange, which will be discussed with reference to the following figure. A MIMO scheme can be utilized when there is a low level of congestion in the network.

While data is being exchanged, network conditions are monitored, at 1004. This monitoring can include reviewing the number of communication pairs in network and/or the amount of data being exchanged in network. Examples, of monitoring techniques include observing a traffic channel to determine how often the traffic channel is being used and/or observing the number of active connections within the network.

At 1006, a determination is made whether there is a change in the congestion level in network. If a change has not occurred ("NO"), method 1000 continues, at 1004, with monitoring of network condition. If a change has occurred ("YES"), at 1008, a determination is made whether the congestion level is at or above a threshold (e.g., the congestion level increased). If the congestion level is below the congestion level ("NO"), method 1000 continues, at 1004, with monitoring of the network conditions since there has not been a significant change since the data exchange was initiated (e.g., network congestion level is considered low).

If the determination, at 1008, is that the congestion level is at or above the threshold level ("YES"), it indicates that there has been a change in the amount of traffic in the network (e.g., a network congestion level is considered high). Based on this change, at 1010, the antenna scheme utilized for data exchange can be switched to receiver beam forming scheme (or another single spatial stream antenna scheme). At 1012, one of two or more reserved distinct set of channel resources is released. Data exchange with peer device continues, at 1014, by utilizing receiver beam forming scheme.

Figure 11:
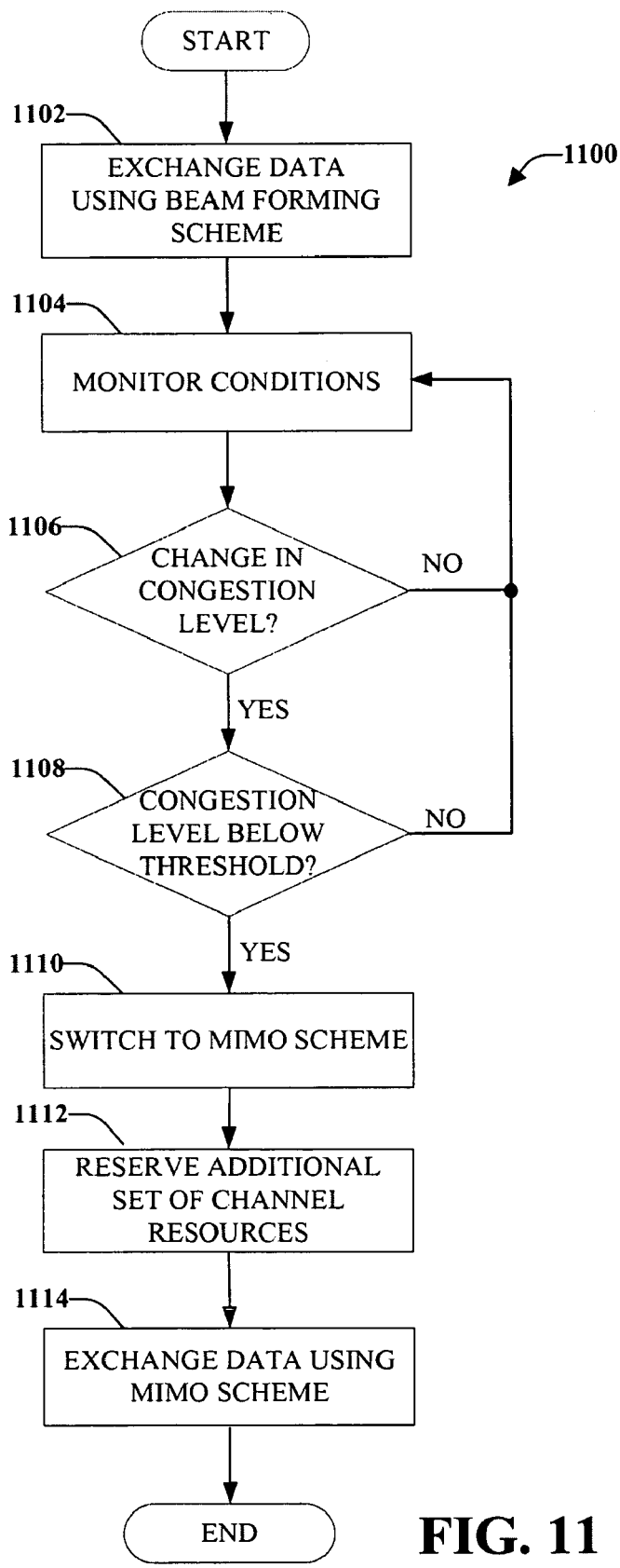
FIG. 11 illustrates a method for switching from receiver beam forming scheme to MIMO scheme as a function of detected congestion level changes in a peer-to-peer communication network, according to an aspect.

FIG. 11 illustrates a method 1100 for switching from receiver beam forming scheme to MIMO scheme as a function of detected congestion level changes in a peer-to-peer communication network, according to an aspect. Method 1100 starts, at 1102, when data is exchanged with a peer node utilizing receiver beam forming scheme or another single spatial stream antenna scheme. The decision to use receiver beam forming scheme could have been made at substantially the same time as initiation of data exchange and/or during data exchange, as discussed with reference to FIG. 10.

At 1104, network conditions are monitored to determine whether there is a change in the amount of traffic in network. At 1106, network congestion level is evaluated to determine if there is a change in the congestion level since the decision to use receiver beam forming scheme, which might have been selected if network congestion was high. If there is no change ("NO"), conditions are monitored, at 1104. If there is a change ("YES"), at 1108, a decision is made whether the congestion level is now below a congestion threshold. If not below the congestion threshold, it indicates that the network condition has not changed in any significant manner (e.g., network congestion is still considered high) and method 1100 continues, at 1104, with monitoring of network conditions.

If the determination, at 1108, is that network congestion level is below the congestion threshold ("YES"), it indicates that the network congestion level has decreased (e.g., changes from high to low). In this situation, method 1100 continues, at 1110, and a switch is made from receiver beam forming scheme to a MIMO scheme or a different multiple spatial stream antenna scheme.

At 1112, at least one additional set of channel resources is reserved. The one (or more) additional set of channel resources is distinct from the already reserved set of channel resources. At 1114, data exchange with peer node continues using MIMO scheme.

Figure 12:
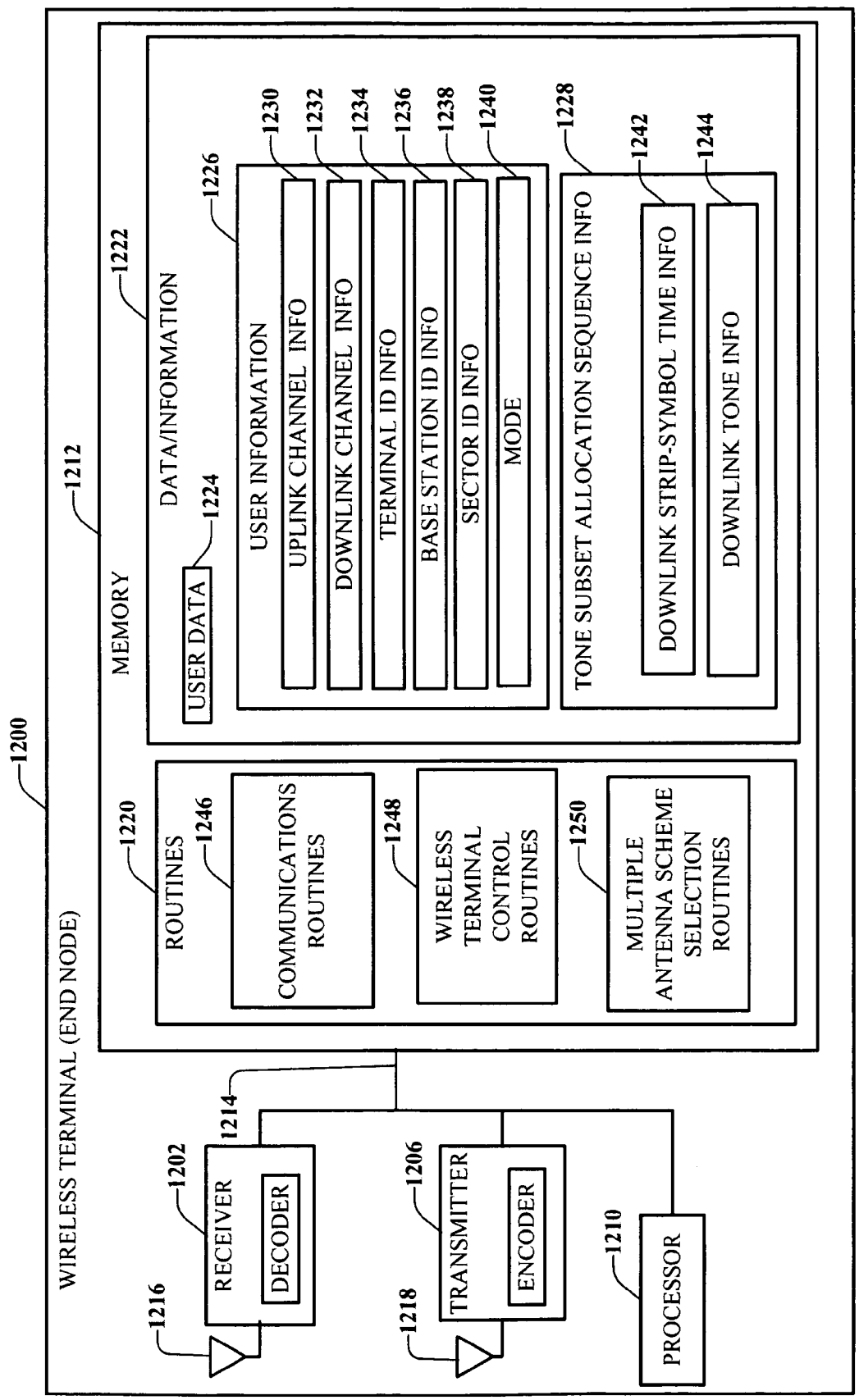
FIG. 12 illustrates an example wireless terminal, according to an aspect.

FIG. 12 illustrates an example wireless terminal (e.g., mobile device, transmitting device, receiving device, and so forth) 1200, which can be used as any one of the wireless terminals (e.g., mobile devices, transmitting device, receiving device, and so on) described herein. According to various aspects, wireless terminal 1200 facilitates selection of a multiple antenna scheme for data exchange in a communications network as a function of network conditions. Wireless terminal 1200 includes a receiver 1202 that includes a decoder 1204, a transmitter 1206 that includes an encoder 1208, a processor 1210, and a memory 1212 which are coupled together by a bus 1214 over which the various elements 1202, 1206, 1210, 1212 can interchange data and information. An antenna 1216 used for receiving signals from a transmitting device is coupled to receiver 1202. An antenna 1218 used for transmitting signals (e.g., to a receiving device, to a peer node) is coupled to transmitter 1206. Processor 1210 (e.g., a CPU) controls operation of wireless terminal 1200 and implements methods by executing routines 1220 and using data/information 1222 in memory 1212.

Data/information 1222 includes user data 1224, user information 1226, and tone subset allocation sequence information 1228. User data 1224 can include data, intended for a peer node, which will be routed to encoder 1208 for encoding prior to transmission by transmitter 1206, and data received from a peer node, which has been processed by decoder 1204 in receiver 1202. User information 1226 includes uplink channel information 120 and downlink channel information 1232. Uplink channel information 1230 includes information identifying uplink channels segments that have been assigned for wireless terminal 1200 to use when transmitting information. Uplink channels can include uplink traffic channels, dedicated uplink control channels (e.g., request channels, power control channels and timing control channels). Each uplink channel includes one or more logic tones, each logical tone following an uplink tone hopping sequence. The uplink hopping sequences are different between each sector type of a cell and between adjacent cells. Downlink channel information 1232 includes information identifying downlink channel segments that have been assigned to wireless terminal 1200 for use when receiving data/information. Downlink channels may include downlink traffic channels and assignment channels, each downlink channel including one or more logical tone, each logical tone following a downlink hopping sequence, which is synchronized between each sector of the cell.

User information 1226 also includes terminal ID information 1234, which is an assigned identification, base station ID information 1236, which identifies the specific base station that wireless terminal 1200 might have established communications with, and sector ID info 738, which identifies the specific sector of the cell where wireless terminal 1200 is presently located. Base station ID 1236 provides a cell slope value and sector ID info 1238 provides a sector index type; the cell slope value and sector index type may be used to derive tone hopping sequences. Mode information 1240, also included in user information 1226, identifies whether the wireless terminal 1200 is in sleep mode, hold mode, on mode, and so forth.

Tone subset allocation sequence information 1228 includes downlink strip-symbol time information 1242 and downlink tone information 1244. Downlink strip-symbol time information 1242 includes frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1244 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1246 and wireless terminal control routines 1248. Communications routines 1246 control the various communications protocols used by wireless terminal 1200. For example, communications routines 1246 can enable communicating through a wide area network and/or a local area peer-to-peer network (e.g., directly with disparate wireless terminal(s)). By way of further example, communications routines 1246 can enable receiving a broadcast signal. Wireless terminal control routines 1248 control basic wireless terminal 1200 functionality including the control of the receiver 1202 and transmitter 1206.

Routines 1220 can also include multiple antenna scheme selection routines 1250. Multiple antenna scheme selection routines can selectively choose a multiple antenna scheme from a plurality of predetermined multiple antenna schemes. The selected multiple antenna scheme can be utilized to communicate with a peer device. The multiple antenna scheme selection routines include monitoring a congestion level in a network. The monitoring can be conducted when a connection is to be initialized. Further, multiple antenna scheme selection routines include selectively switching between various multiple antenna schemes as a function of network conditions. In accordance with some aspects, the monitoring can continue throughout the course of data exchange with peer node, if conditions change (e.g., congestion in network increases, congestion in network decreases), a switch from the original selected multiple antenna scheme to the original non-selected multiple antenna scheme can occur to compensate for the changed network conditions. The switch from the originally selected multiple antenna scheme to the newly selected multiple antenna scheme can be transparent such that data exchange is not interrupted.

Figure 13:
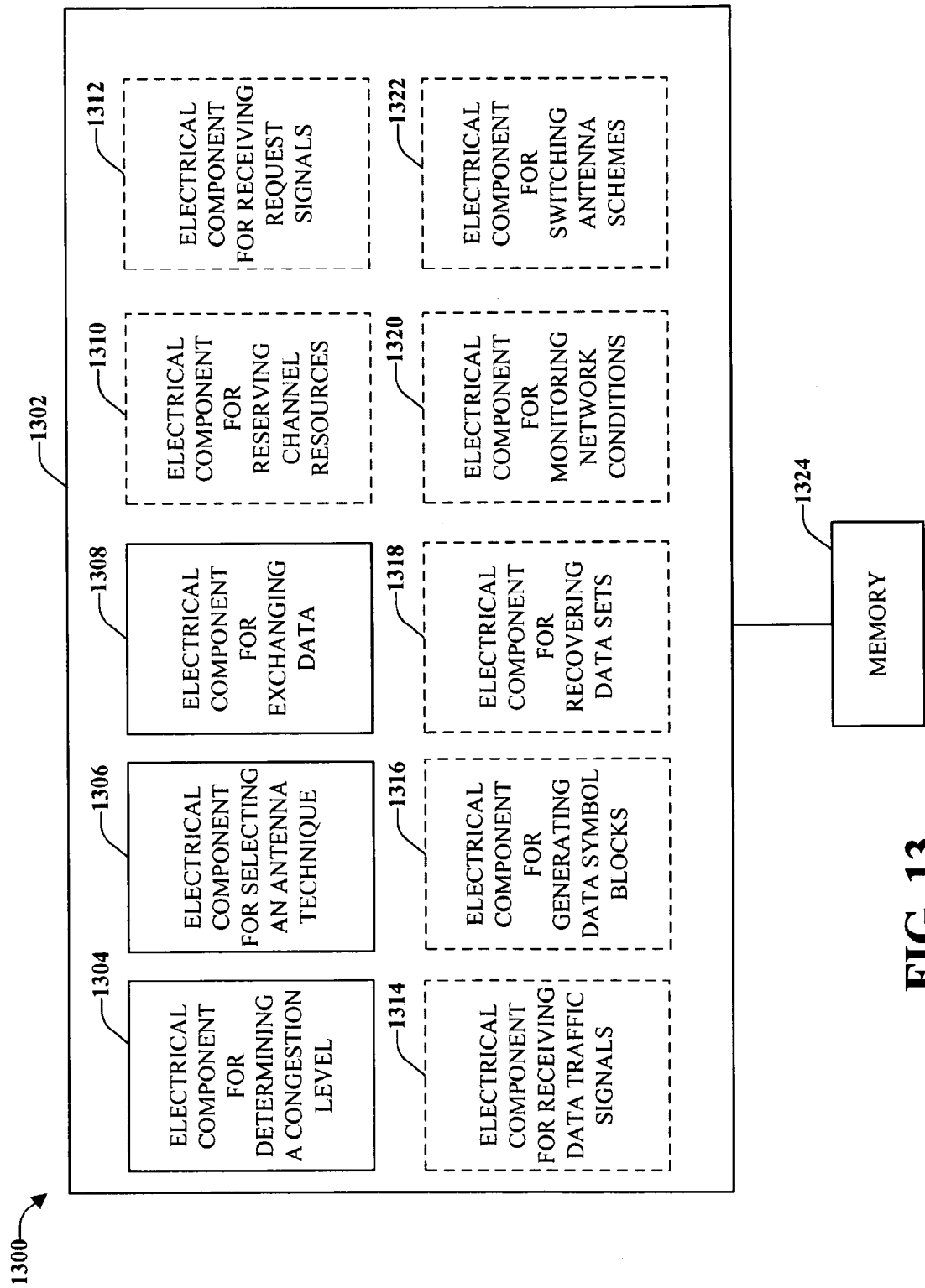
FIG. 13 illustrates an example system that selects between a plurality of predetermined multiple antenna schemes as a function of a congestion level in an ad hoc environment, according to an aspect.

With reference to FIG. 13, illustrated is an example system 1300 that selects between a plurality of predetermined multiple antenna schemes as a function of a congestion level in an ad hoc environment, according to an aspect. For example, system 1300 may reside at least partially within a mobile device. It is to be appreciated that system 1300 is represented as including functional blocks, which may be functional blocks that represent functions implemented by a processor, software, or combination thereof (e.g., firmware).

System 1300 includes a logical grouping 1302 of electrical components that can act separately or in conjunction. Logical grouping 1302 includes an electrical component 1304 for determining a level of congestion in a communications network and an electrical component 1306 for selecting a multiple antenna scheme from a plurality of multiple antenna schemes as a function of the determined level of congestion. Further, logical grouping 1302 includes an electrical component 1308 for utilizing the selected multiple antenna scheme to establish a data exchange with a peer node. According to some aspects, the multiple antenna schemes include a receiver beam forming scheme and a multiple-input-multiple-output (MIMO) scheme.

In accordance with some aspects, electrical component 1304 for determining a level of congestion in communications network can further estimate a number of connections currently active in network and compare the estimated number of active connections with a predetermined active connection threshold. Based on this comparison, electrical component 1304 can determine the level of congestion is low if the estimated number of active connections is below the active connection threshold. It the estimated number of active connections is at or above the active connection threshold, electrical component 1304 can determine the level of congestion is high.

According to some aspects, electrical component 1304 for determining a level of congestion in communications network can further estimate an amount of traffic exchange occurring in communications network and comparing the estimated amount of traffic with a predetermined active connection threshold. Based on the comparison, electrical component 1304 can determine the level of congestion is low if the estimated amount of traffic is below the active connection threshold. If the estimated amount of traffic is at or above the active connection threshold, electrical component 1304 can determine the level of congestion is high.

According to aspects that employ MIMO scheme, electrical grouping 1302 can include an electrical component 1310 for reserving at least two distinct sets of channel resources, wherein a set of channel resources comprise a tone in an OFDM symbol. Also included is an electrical component 1312 for receiving a first transmission request signal and a second transmission request signal. First transmission request signal indicates peer node intends to send a first set of data information in a traffic segment and can be received in one of the at least two distinct sets of channel resources. Second transmission request signal indicates peer node intends to send a second set of data in the traffic segment. Second transmission request signal can be received in a different one of the at least two distinct sets of channel resources. Also included in logical grouping 1302 is an electrical component 1314 for receiving a data traffic signal in the traffic segment. The data traffic signal can be received at two or more antennas.

Additionally, logical grouping 1302 can include an electrical component 1316 for applying a MIMO receive matrix to the received data traffic signal to generate a first transformed data symbol block and a second transformed data symbol block. Also included is an electrical component 1318 for recovering a first set of data information for the first transformed data symbol block and a second set of data information for the second transformed data symbol block. MIMO receive matrix can be calculated to diagonalize a MIMO channel from peer device to mobile device.

In accordance with aspects that employ receiver beam forming scheme, electrical component 1310 for reserving channel resources, reserves one set of channel resources and electrical component 1312 for receiving request signals receives a transmission request signal in the set of channel resources. The transmission request signal indicates peer node intends to send a set of data information in a traffic segment. Further, electrical component 1314 for receiving data traffic signals receives, at two or more antennas, a data traffic signal in the traffic segment.

Additionally, electrical component 1316 for generating data symbol blocks can apply a receiver beam forming vector to the received data traffic signal to generate a transformed data symbol block and electrical component 1318 for recovering data sets can recover a set of data information from the transformed data symbol block. The receiver beam forming vector can be calculated to maximize a signal to interference plus noise ratio of the transformed data symbol block.

In accordance with some aspects, electrical component 1308 for exchanging data with peer device exchanges data using the selected multiple antenna scheme. Also included is an electrical component 1320 for monitoring network conditions for a change in the congestion level. If the congestion level changes, an electrical component 1322 selectively switches from the selected multiple antenna scheme to one of the non-selected multiple antenna schemes. Electrical component 1308 continues to exchange data with peer node using the newly selected multiple antenna scheme.

For example, when a receiver beam forming scheme is utilized, electrical component 1308 exchanges data with peer node using receiver beam forming scheme. Electrical component 1320 monitors network conditions for a change in the congestion level, and electrical component 1322 switches from receiver beam forming scheme to MIMO scheme if congestion level changes from high to low. Electrical component 1310 reserves at least one additional set of channel resources, which is distinct from the already reserved set of channel resources, and electrical component 1308 continues to exchange data with peer node using MIMO scheme.

In another example, when MIMO scheme is utilized, electrical component 1308 exchanges data with peer node using MIMO scheme and electrical component 1320 monitors network conditions for a change in the congestion level. If congestion level changes from low to high, electrical component 1322 switches from MIMO scheme to receiver beam forming scheme. Electrical component 1310 for reserving channel resources can release one of the two or more reserved distinct sets of channel resources. Electrical component 1308 continues to exchange data with peer node using receiver beam forming scheme.

Additionally, system 1300 can include a memory 1324 that retains instructions for executing functions associated with electrical components 1304-1322, or other components. While shown as being external to memory 1324, it is to be understood that one or more of electrical components 1304-1322 may exist within memory 1324.

Figure 14:
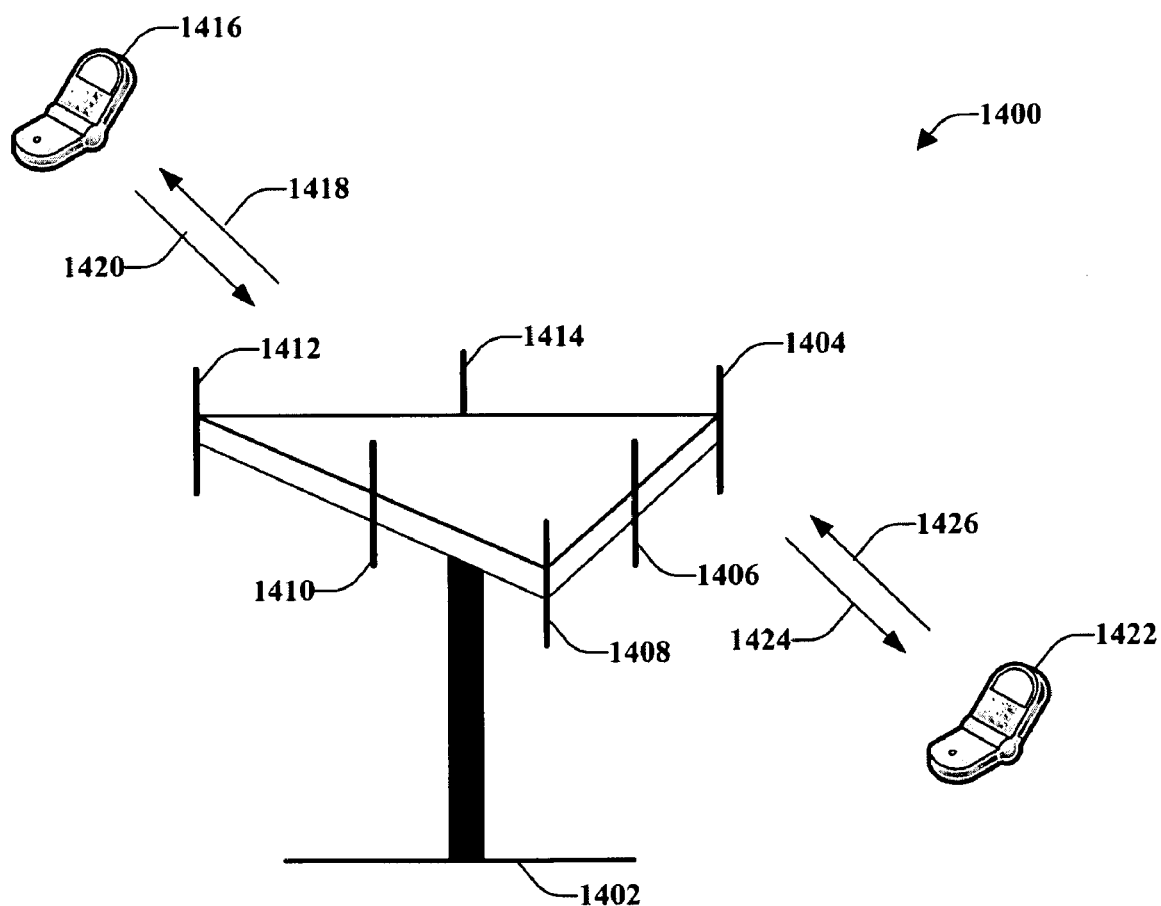
FIG. 14 illustrates a wireless communication system in accordance with various aspects.

Referring now to FIG. 14, illustrated is a wireless communication system 1400 in accordance with various aspects. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 1402 can be a home base station, a Femto base station, and/or the like.

Base station 1402 can communicate with one or more devices such as device 1416; however, it is to be appreciated that base station 1402 can communicate with substantially any number of devices similar to device 1416. As depicted, device 1416 is in communication with antennas 1404 and 1406, where antennas 1404 and 1406 transmit information to device 1416 over a forward link 1418 and receive information from device 1416 over a reverse link 1420. In a frequency division duplex (FDD) system, forward link 1418 can utilize a different frequency band than that used by reverse link 1420, for example. Further, in a time division duplex (TDD) system, forward link 1418 and reverse link 1420 can utilize a common frequency band.

In addition, devices 1422 and 1424 can be communicating with one another, such as in a peer-to-peer configuration. Moreover, device 1422 is in communication with device 1424 using links 1426 and 1428. In a peer-to-peer ad hoc network, devices within range of each other, such as devices 1422 and 1424, communicate directly with each other without a base station 1402 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

Figure 15:
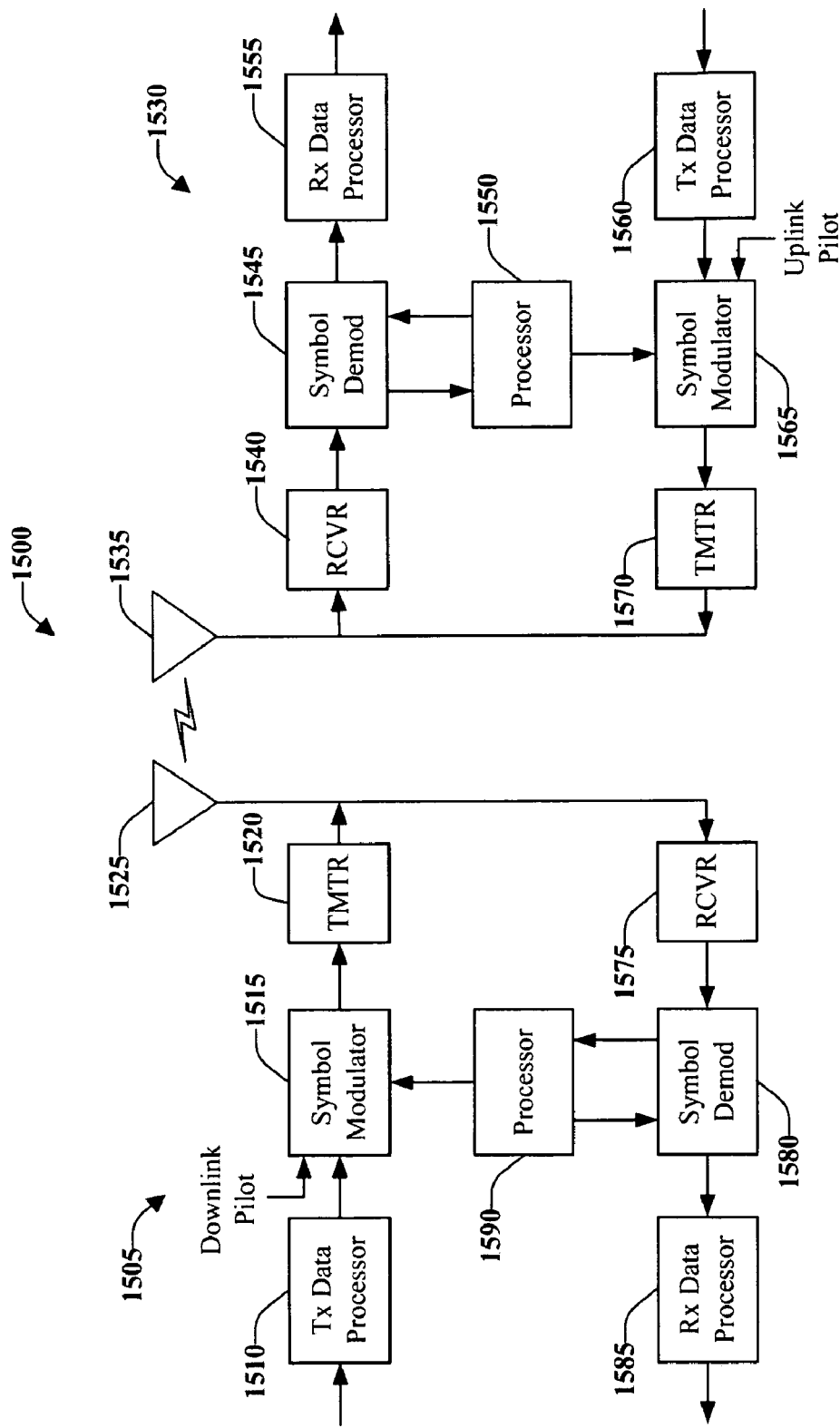
FIG. 15 illustrates an exemplary wireless communication system, according to various aspects.

FIG. 15 illustrates an exemplary wireless communication system 1500, according to various aspects. Wireless communication system 1500 depicts one base station and one terminal for sake of brevity. However, it is to be appreciated that system 1500 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 15, on a downlink, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1515 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1520 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1525 to the terminals. At terminal 1530, an antenna 1535 receives the downlink signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 obtains N received symbols and provides received pilot symbols to a processor 1550 for channel estimation. Symbol demodulator 1545 further receives a frequency response estimate for the downlink from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the uplink, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an uplink signal, which is transmitted by the antenna 1535 to the access point 1505.

At access point 1505, the uplink signal from terminal 1530 is received by the antenna 1525 and processed by a receiver unit 1575 to obtain samples. A symbol demodulator 1580 then processes the samples and provides received pilot symbols and data symbol estimates for the uplink. An RX data processor 1585 processes the data symbol estimates to recover the traffic data transmitted by terminal 1530. A processor 1590 performs channel estimation for each active terminal transmitting on the uplink.

Processors 1590 and 1550 direct (e.g., control, coordinate, manage, . . . ) operation at access point 1505 and terminal 1530, respectively. Respective processors 1590 and 1550 can be associated with memory units (not shown) that store program codes and data. Processors 1590 and 1550 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1590 and 1550.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method of operating a first wireless communications device for selection of a multiple antenna scheme for data exchange in a peer-to-peer communications network, wherein the first wireless communications device is equipped with at least two antennas, the method comprising:
   determining a level of congestion in the peer-to-peer communications network;
   selecting a multiple antenna scheme from a plurality of predetermined multiple antenna schemes as a function of the determined level of congestion;
   utilizing the selected multiple antenna scheme to establish a data exchange with a second peer wireless communications device within the peer-to-peer communications network,
   wherein the plurality of predetermined multiple antenna schemes comprise a receiver beam forming scheme and a multiple-input-multiple-output (MIMO) scheme,
   wherein selecting the multiple antenna scheme from the plurality of predetermined multiple antenna schemes as a function of the determined level of congestion comprises:
      selecting the receiver beam forming scheme if the determined level of congestion is high, and
      selecting the MIMO scheme if the determined level of congestion is low;
   exchanging data with the second peer wireless communications device using the MIMO scheme;
   monitoring network conditions for a change in the congestion level;
   switching from the MIMO scheme to the receiver beam forming scheme if the congestion level changes from low to high;
   releasing one of at least two reserved distinct sets of channel resources; and
   continuing to exchange data with the second peer wireless communications device using the receiver beam forming scheme.

2. The method of claim 1, wherein determining a level of congestion in the peer-to-peer communications network comprises:
   estimating a number of connections currently active in the peer-to-peer communications network;
   comparing the estimated number of active connections with a predetermined active connection threshold; and
   determining whether the level of congestion is low or high, wherein the level of congestion is low if the estimated number of active connections is below the active connection threshold and the level of congestion is high if the estimated number of active connections is at or above the active connection threshold.

3. The method of claim 1, wherein determining a level of congestion in the peer-to-peer communications network comprises:
   estimating an amount of traffic exchange occurring in the peer-to-peer communications network;
   comparing the estimated amount of traffic exchange with a predetermined active connection threshold; and
   determining whether the level of congestion is low or high, wherein the level of congestion is low if the estimated amount of traffic is below the active connection threshold and that the level of congestion is high if the estimated amount of traffic is at or above the active connection threshold.

4. The method of claim 1, further comprising:
   reserving at least two distinct sets of channel resources if the MIMO scheme is selected;
   receiving a first transmission request signal in one of the at least two distinct sets of channel resources, wherein the first transmission request signal indicates the second peer wireless communications device intends to send a first set of data information to the first wireless communications device in a traffic segment;
   receiving a second transmission request signal in a different one of the at least two distinct sets of channel resources, wherein the second transmission request signal indicates the second peer wireless communications device intends to send a second set of data to the first wireless communications device in the traffic segment; and
   receiving, at the at least two antennas, a data traffic signal in the traffic segment.

5. The method of claim 4, wherein a set of channel resources comprise a tone in an OFDM symbol.

6. The method of claim 4, further comprising:
   applying a MIMO receive matrix to the received data traffic signal to generate a first transformed data symbol block and a second transformed data symbol block; and
   recovering a first set of data information for the first transformed data symbol block and a second set of data information for the second transformed data symbol block.

7. The method of claim 6, wherein the MIMO receive matrix is calculated to diagonalize a MIMO channel from the second peer wireless communications device to the first wireless communications device.

8. A method of operating a first wireless communications device for selection of a multiple antenna scheme for data exchange in a peer-to-peer communications network, wherein the first wireless communications device is equipped with at least two antennas, the method comprising:
   determining a level of congestion in the peer-to-peer communications network;
   selecting a multiple antenna scheme from a plurality of predetermined multiple antenna schemes as a function of the determined level of congestion; and
   utilizing the selected multiple antenna scheme to establish a data exchange with a second peer wireless communications device within the peer-to-peer communications network,
   wherein the plurality of predetermined multiple antenna schemes comprise a receiver beam forming scheme and a multiple-input-multiple-output (MIMO) scheme,
   wherein selecting the multiple antenna scheme from the plurality of predetermined multiple antenna schemes as a function of the determined level of congestion comprises:
      selecting the receiver beam forming scheme if the determined level of congestion is high, and
      selecting the MIMO scheme if the determined level of congestion is low;
   exchanging data with the second peer wireless communications device using the receiver beam forming scheme;
   monitoring network conditions for a change in the congestion level;
   switching from the receiver beam forming scheme to the MIMO scheme if the congestion level changes from high to low;

reserving at least one additional set of channel resources, wherein the one additional set of channel resources is distinct from an already reserved set of channel resources; and continuing to exchange data with the second peer wireless communications device using the MIMO scheme.

9. The method of claim 8, further comprising:

reserving one set of channel resources if the receiver beam forming scheme is selected;

receiving a transmission request signal in the set of channel resources, wherein the transmission request signal indicates the second peer wireless communications device intends to send a set of data information to the first wireless communications device in a traffic segment; and receiving, at the at least two antennas, a data traffic signal in the traffic segment.

10. The method of claim 9, further comprising:

applying a receiver beam forming vector to the received data traffic signal to generate a transformed data symbol block; and recovering a set of data information from the transformed data symbol block.

11. The method of claim 10, wherein the receiver beam forming vector is calculated to maximize the signal to interference plus noise ratio of the transformed data symbol block.

12. A communications apparatus, comprising:

a memory that retains instructions related to ascertaining whether a level of congestion in a peer-to-peer communications network is a high level of congestion or a low level of congestion, selecting a multiple antenna scheme from a plurality of predetermined multiple antenna schemes as a function of whether the congestion level is low or high, and utilizing the selected multiple antenna scheme to exchange data with a peer node; and a processor, coupled to the memory, configured to execute the instructions retained in the memory, wherein the plurality of predetermined multiple antenna schemes comprise a receiver beam forming scheme and a multiple-input-multiple-output (MIMO) scheme, and wherein the memory retains further instructions related to:

selecting the receiver beam forming scheme if the ascertained level of congestion is high, selecting the MIMO scheme if the ascertained level of congestion is low, exchanging data with the peer node using the MIMO scheme;

monitoring network conditions for a change in the congestion level, switching from the MIMO scheme to the receiver beam forming scheme if the congestion level changes from low to high, releasing one of two or more reserved distinct sets of channel resources, and continuing to exchange data with the peer node using the receiver beam forming scheme.

13. The communications apparatus of claim 12, wherein when the MIMO scheme is chosen, the memory retains further instructions related to reserving two or more distinct sets of channel resources, receiving a first transmission request signal in one of the two or more distinct sets of channel resources, receiving a second transmission request signal in a different one of the two or more distinct sets of channel resources, and receiving a data traffic signal in the traffic segment, wherein the first transmission request signal indicates the peer node intends to send a first set of data information in a traffic segment and the second transmission request signal indicates the peer node intends to send a second set of data in a traffic segment.

14. A communications apparatus that exchanges data in a peer-to-peer communications network, comprising:

means for evaluating a network congestion level;

means for selecting a multiple antenna scheme from a plurality of predetermined multiple antenna schemes as a function of the network congestion level; and means for utilizing the selected multiple antenna scheme to exchange data with a peer node within the peer-to-peer communications network, wherein the plurality of predetermined multiple antenna schemes comprise a receiver beam forming scheme and a multiple-input-multiple-output (MIMO) scheme, wherein the means for selecting the multiple antenna scheme from the plurality of predetermined multiple antenna schemes as a function of the network congestion level is configured to:

select the receiver beam forming scheme if the evaluated level of congestion is high, and select the MIMO scheme if the evaluated level of congestion is low;

means for exchanging data with the peer node using the MIMO scheme;

means for monitoring network conditions for a change in the network congestion level;

means for switching from the MIMO scheme to the receiver beam forming scheme if the network congestion level changes from low to high;

means for releasing one of at least two reserved distinct sets of channel resources; and means for continuing to exchange data with the peer node using the receiver beam forming scheme.

15. The communications apparatus of claim 14, wherein the means for evaluating the network congestion level estimates a number of active connections, compares the estimated number of active connections with a predetermined active connection threshold, and establishes whether the congestion level is low or high, wherein the congestion level is low if the estimated number of active connections is below the active connection threshold and the congestion level is high if the estimated number of active connections is at or above the active connection threshold.

16. The communications apparatus of claim 14, wherein the means for evaluating the network congestion level estimates an amount of traffic exchange occurring in the peer-to-peer communications network, compares the estimated amount of traffic exchange with a predetermined active connection threshold, and establishes whether the congestion level is high or low, wherein the congestion level is high if the estimated amount of traffic is at or above the active connection threshold and the congestion level is low if the estimated amount of traffic is below the active connection threshold.

17. A computer program product, comprising:

a non-transitory computer-readable medium comprising:

a first set of codes for causing a computer to estimate a congestion level in a peer-to-peer communication network;

a second set of codes for causing the computer to select a receiver beam forming scheme or a MIMO scheme for data exchange as a function of the congestion level, wherein the second set of codes causes the computer to select the receiver beam forming scheme if the estimated level of congestion is high and select the MIMO scheme if the estimated level of congestion is low;

a third set of codes for causing the computer to continue to monitor the congestion level during the data exchange in order to determine if the congestion level changes; and a fourth set of codes for causing the computer to switch between the receiver beam forming scheme and the MIMO scheme if the congestion level changes, wherein the switch is from the receiver beam forming scheme to the MIMO scheme if the congestion level changes from high to low and from the MIMO scheme to the receiver beam forming scheme if the congestion level changes from low to high;

a fifth set of codes for causing the computer to exchange data with a peer node using the MIMO scheme;

a sixth set of codes for causing the computer to release one of at least two reserved distinct sets of channel resources when the fourth set of codes causes the computer to switch from the MIMO scheme to the receiver beam forming scheme if the congestion level changes from low to high; and a seventh set of codes for causing the computer to continue to exchange data with the peer node using the receiver beam forming scheme.

18. The computer program product of claim 17, wherein the congestion level is low if the estimated congestion level is below a predetermined congestion threshold and the congestion level is high if the estimated congestion level is at or above the predetermined congestion threshold.

19. At least one processor for use in a communications apparatus that exchanges data in a peer-to-peer communications network, the processor configured to cause the apparatus to use different antenna techniques to exchange data with a peer wireless communications device within the peer-to-peer communications network, the processor comprising:

a first module for determining whether a level of congestion in the peer-to-peer communications network is a low level or a high level;

a second module for selecting a multiple antenna scheme from a plurality of predetermined multiple antenna schemes as a function of whether the level of congestion is the low level or the high level; and a third module for exchanging data with the peer wireless communications device using the selected multiple antenna scheme, wherein the plurality of predetermined multiple antenna schemes comprise a receiver beam forming scheme and a MIMO scheme and the third module utilizes the MIMO scheme to exchange data with the peer wireless communications device, the processor further comprising:

a fourth module for monitoring network conditions for a change in the level of congestion;

a fifth module for switching from the MIMO scheme to the receiver beam forming scheme if the level of congestion level changes from the low level to the high level; and a sixth module for releasing one of at least two reserved distinct sets of channel resources, the third module continues to exchange data with the peer wireless communications device using the receiver beam forming scheme.

20. At least one processor for use in a communications apparatus that exchanges data in a peer-to-peer communications network, the processor configured to cause the apparatus to use different antenna techniques to exchange data with a peer wireless communications device within the peer-to-peer communications network, the processor comprising:

a first module for determining whether a level of congestion in the peer-to-peer communications network is a low level or a high level;

a second module for selecting a multiple antenna scheme from a plurality of predetermined multiple antenna schemes as a function of whether the level of congestion is the low level or the high level; and a third module for exchanging data with the peer wireless communications device using the selected multiple antenna scheme, wherein the plurality of predetermined multiple antenna schemes comprise a receiver beam forming scheme and a MIMO scheme and the third module utilizes the receiver beam forming scheme to exchange data with the peer wireless communications device, the processor further comprising:

a fourth module for monitoring network conditions for a change in the level of congestion;

a fifth module for switching from the receiver beam forming scheme to the MIMO scheme if the level of congestion changes from the high level to the low level; and a sixth module for reserving at least one set of channel resources, wherein the one set of channel resources is distinct from an already reserved set of channel resources, the third module continues to exchange data with the peer wireless communications device using the MIMO scheme.

21. A communications apparatus, comprising:

a memory that retains instructions related to ascertaining whether a level of congestion in a peer-to-peer communications network is a high level of congestion or a low level of congestion, selecting a multiple antenna scheme from a plurality of predetermined multiple antenna schemes as a function of whether the congestion level is low or high, and utilizing the selected multiple antenna scheme to exchange data with a peer node; and a processor, coupled to the memory, configured to execute the instructions retained in the memory, wherein the plurality of predetermined multiple antenna schemes comprise a receiver beam forming scheme and a multiple-input-multiple-output (MIMO) scheme, and wherein the memory retains further instructions related to:

selecting the receiver beam forming scheme if the ascertained level of congestion is high, selecting the MIMO scheme if the ascertained level of congestion is low, exchanging data with the peer node using the receiver beam forming scheme, monitoring network conditions for a change in the congestion level, switching from the receiver beam forming scheme to the MIMO scheme if the congestion level changes from high to low, reserving at least one additional set of channel resources, wherein the one additional set of channel resources is distinct from an already reserved set of channel resources, and continuing to exchange data with the peer node using the MIMO scheme.

22. The communication apparatus of claim 21, wherein when the receiver beam forming scheme is selected, the memory retains further instructions related to reserving one set of channel resources, receiving a transmission request signal in the set of channel resources, and receiving a data traffic signal in the traffic segment, wherein the transmission request signal indicates the peer node intends to send a set of data information in a traffic segment.

23. A communications apparatus that exchanges data in a peer-to-peer communications network, comprising:
- means for evaluating a network congestion level;
- means for selecting a multiple antenna scheme from a plurality of predetermined multiple antenna schemes as a function of the network congestion level; and
- means for utilizing the selected multiple antenna scheme to exchange data with a peer node within the peer-to-peer communications network,
- wherein the plurality of predetermined multiple antenna schemes comprise a receiver beam forming scheme and a multiple-input-multiple-output (MIMO) scheme,
- wherein the means for selecting the multiple antenna scheme from the plurality of predetermined multiple antenna schemes as a function of the network congestion level is configured to:
  - select the receiver beam forming scheme if the evaluated level of congestion is high, and
  - select the MIMO scheme if the evaluated level of congestion is low;
- means for exchanging data with the peer node using the receiver beam forming scheme;
- means for monitoring network conditions for a change in the network congestion level;
- means for switching from the receiver beam forming scheme to the MIMO scheme if the network congestion level changes from high to low;
- means for reserving at least one additional set of channel resources, wherein the one additional set of channel resources is distinct from an already reserved set of channel resources; and
- means for continuing to exchange data with the peer node using the MIMO scheme.

24. A computer program product, comprising:
a non-transitory computer-readable medium comprising:
- a first set of codes for causing a computer to estimate a congestion level in a peer-to-peer communication network;
- a second set of codes for causing the computer to select a receiver beam forming scheme or a MIMO scheme for data exchange as a function of the congestion level, wherein the second set of codes causes the computer to select the receiver beam forming scheme if the estimated level of congestion is high and select the MIMO scheme if the estimated level of congestion is low;
- a third set of codes for causing the computer to continue to monitor the congestion level during the data exchange in order to determine if the congestion level changes; and
- a fourth set of codes for selectively switching between the receiver beam forming scheme and the MIMO scheme if the congestion level changes, wherein the switch is from the receiver beam forming scheme to the MIMO scheme if the congestion level changes from high to low and from the MIMO scheme to the receiver beam forming scheme if the congestion level changes from low to high;
- a fifth set of codes for causing the computer to exchange data with a peer node using the receiver beam forming scheme;
- a sixth set of codes for causing the computer to reserve at least one additional set of channel resources when the second set of codes causes the computer to switch from the receiver beam forming scheme to the MIMO scheme if the congestion level changes from high to low, wherein the one additional set of channel resources is distinct from an already reserved set of channel resources; and
- a seventh set of codes for causing the computer to continue to exchange data with the peer node using the MIMO scheme.

* * * * *